United States Patent
Park et al.

(10) Patent No.: US 6,950,419 B1
(45) Date of Patent: Sep. 27, 2005

(54) METHOD FOR INTERFACING ASYNCHRONOUS MOBILE COMMUNICATION SYSTEM WITH AT LEAST ONE CORE NETWORK

(75) Inventors: Jae-Hong Park, Ichon-shi (KR); Woon-Hee Hwang, Ichon-shi (KR); Jeong-Hwa Ye, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 738 days.

(21) Appl. No.: 09/699,618

(22) Filed: Oct. 30, 2000

(30) Foreign Application Priority Data

Oct. 28, 1999 (KR) .............................. 1999-46999
Nov. 18, 1999 (KR) .............................. 1999-51355

(51) Int. Cl.[7] .............................................. H64Q 7/24
(52) U.S. Cl. ...................... 370/338; 370/352; 370/466; 455/435.2
(58) Field of Search ................................ 370/401, 465, 370/467, 469, 352–356, 338, 466, 349; 455/435.2, 455/435.3, 522.1

(56) References Cited

U.S. PATENT DOCUMENTS

| | | | | |
|---|---|---|---|---|
| 5,946,634 | A * | 8/1999 | Korpela .................... | 455/552.1 |
| 6,397,065 | B1 * | 5/2002 | Huusko et al. .......... | 455/435.2 |
| 6,498,933 | B1 * | 12/2002 | Park et al. ................ | 455/436 |
| 6,501,953 | B1 * | 12/2002 | Braun et al. .............. | 455/436 |
| 6,546,247 | B1 * | 4/2003 | Foti et al. .................. | 455/433 |
| 6,584,314 | B1 * | 6/2003 | Haumont et al. ........ | 455/435.1 |
| 6,668,175 | B1 * | 12/2003 | Almgren et al. ........... | 455/522 |
| 6,697,620 | B1 * | 2/2004 | Lamb et al. .............. | 455/432.1 |
| 6,704,581 | B1 * | 3/2004 | Park et al. ................ | 455/553.1 |

FOREIGN PATENT DOCUMENTS

| EP | 0852448 | 7/1998 |
|---|---|---|
| WO | 9830042 | 7/1998 |

\* cited by examiner

*Primary Examiner*—Ajit Patel
*Assistant Examiner*—Steven Blount
(74) *Attorney, Agent, or Firm*—McDonnell Boehnen Hulbert & Berghoff LLP

(57) ABSTRACT

A method for The method for transmitting a message between a mobile communication system and at least a core network, the mobile communication system having a mobile station and a radio network, the method comprising the steps of: a) at the radio network, discriminating an operating type of a core network(s) coupled thereto; b) at the radio network, generating and transmitting a system information message having core network operating type information and information related to the core network; c) if two or more core networks are coupled to the asynchronous mobile communication system, at the mobile station, selecting one core network to be communicated with, based on the system information message; d) operating a call control entity and a mobility management entity according to an operating type of the selected core network; and e) communicating messages between the mobile station and the radio network, the message having a different data format according to the operating type of the selected core network.

22 Claims, 18 Drawing Sheets

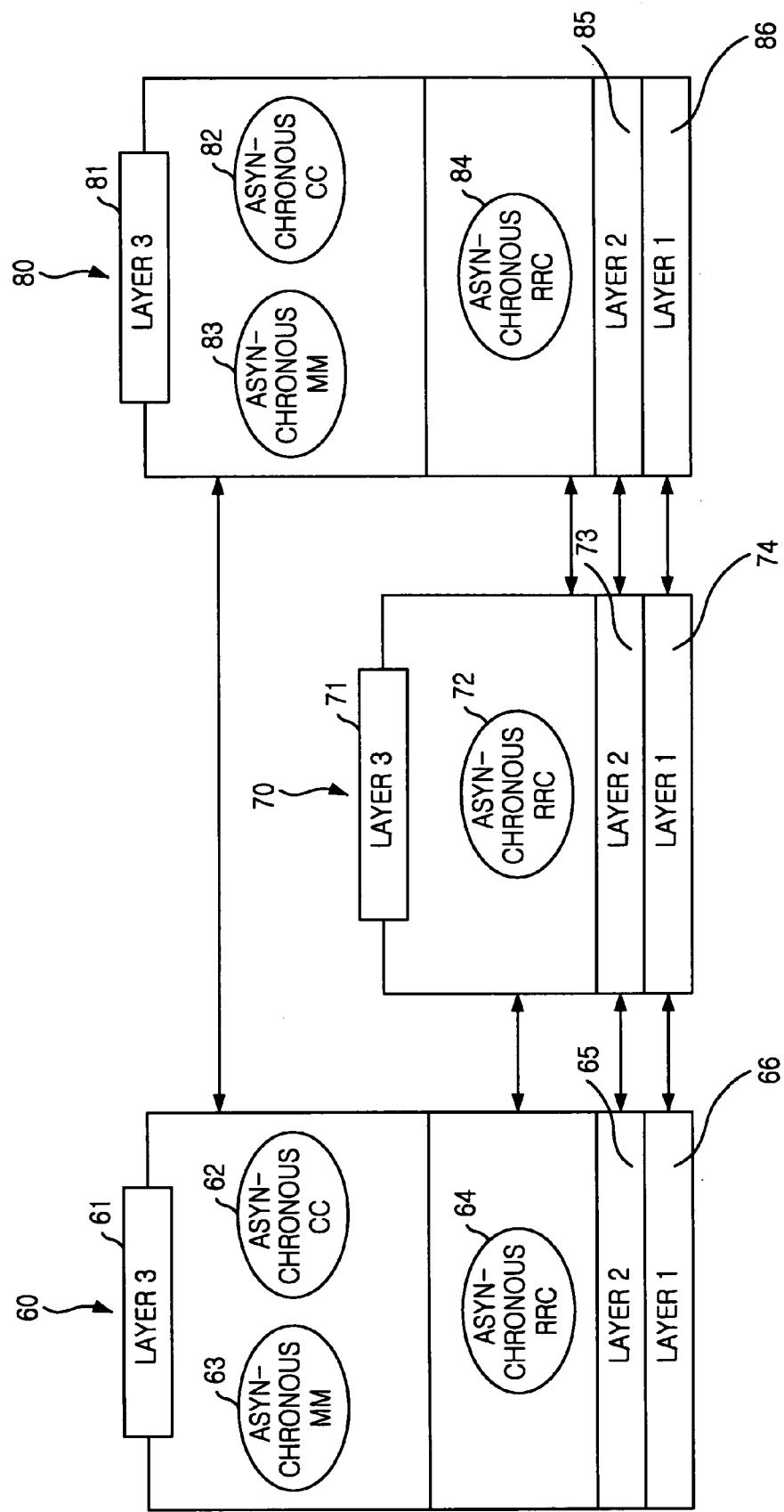

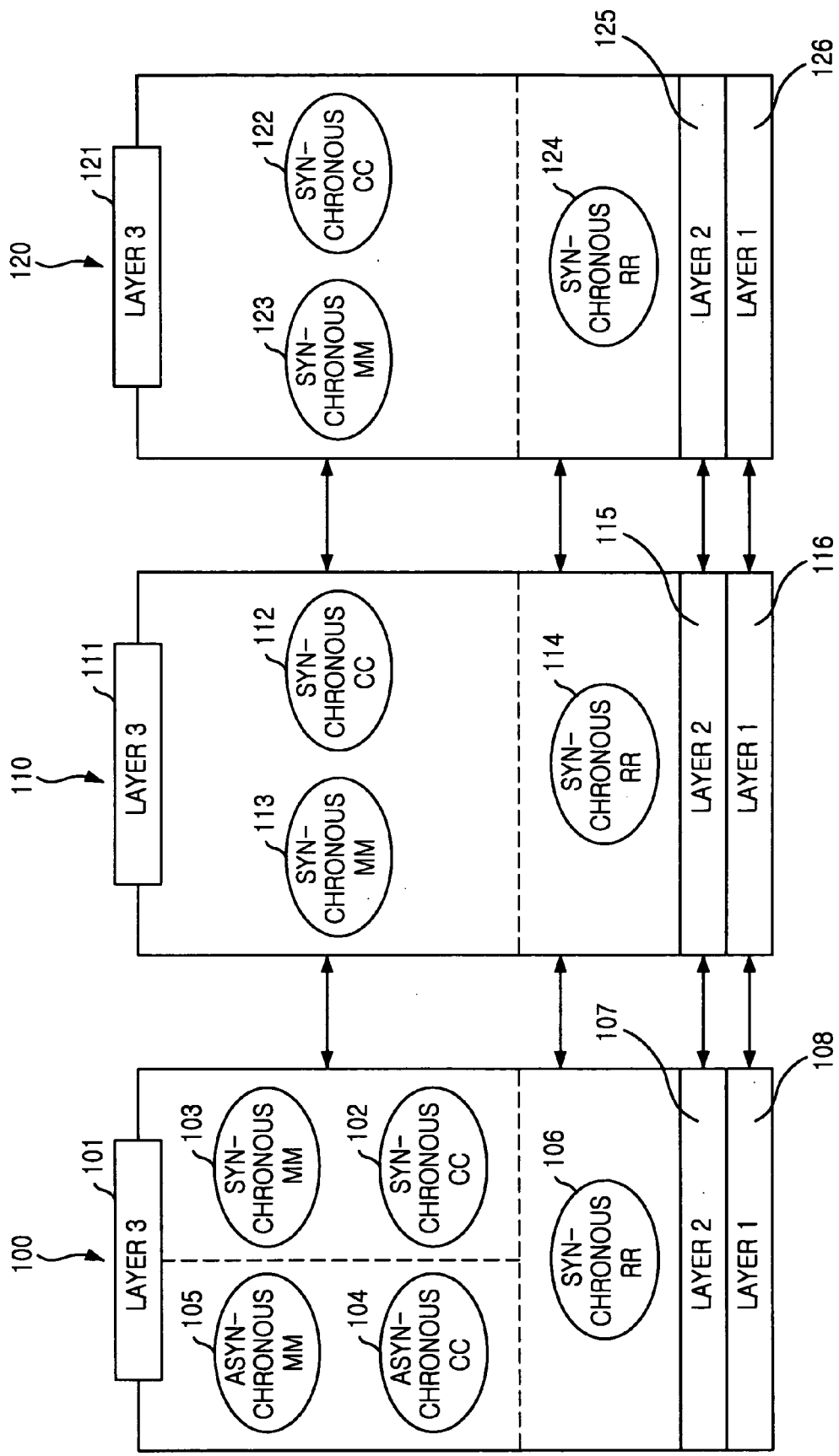

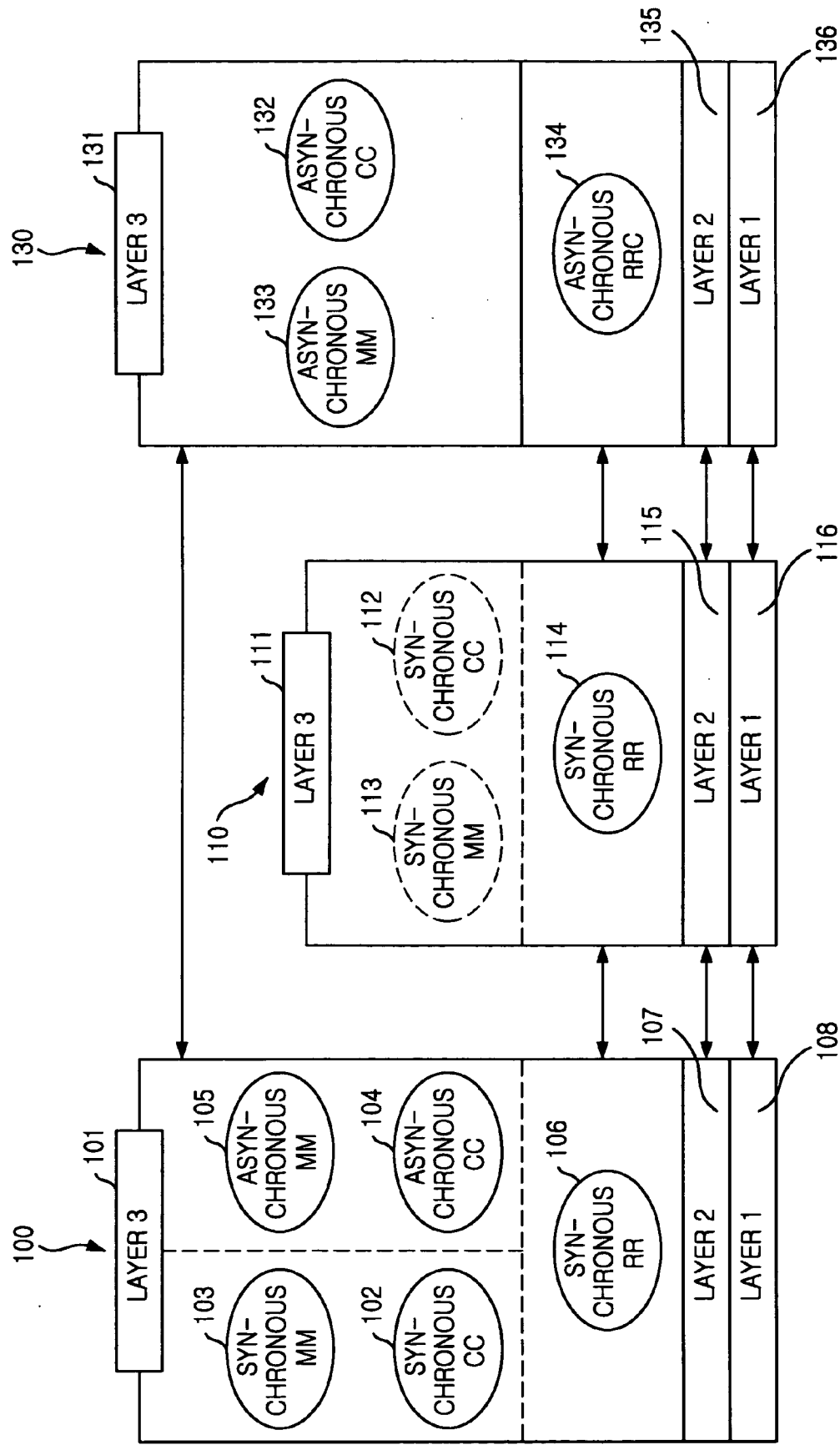

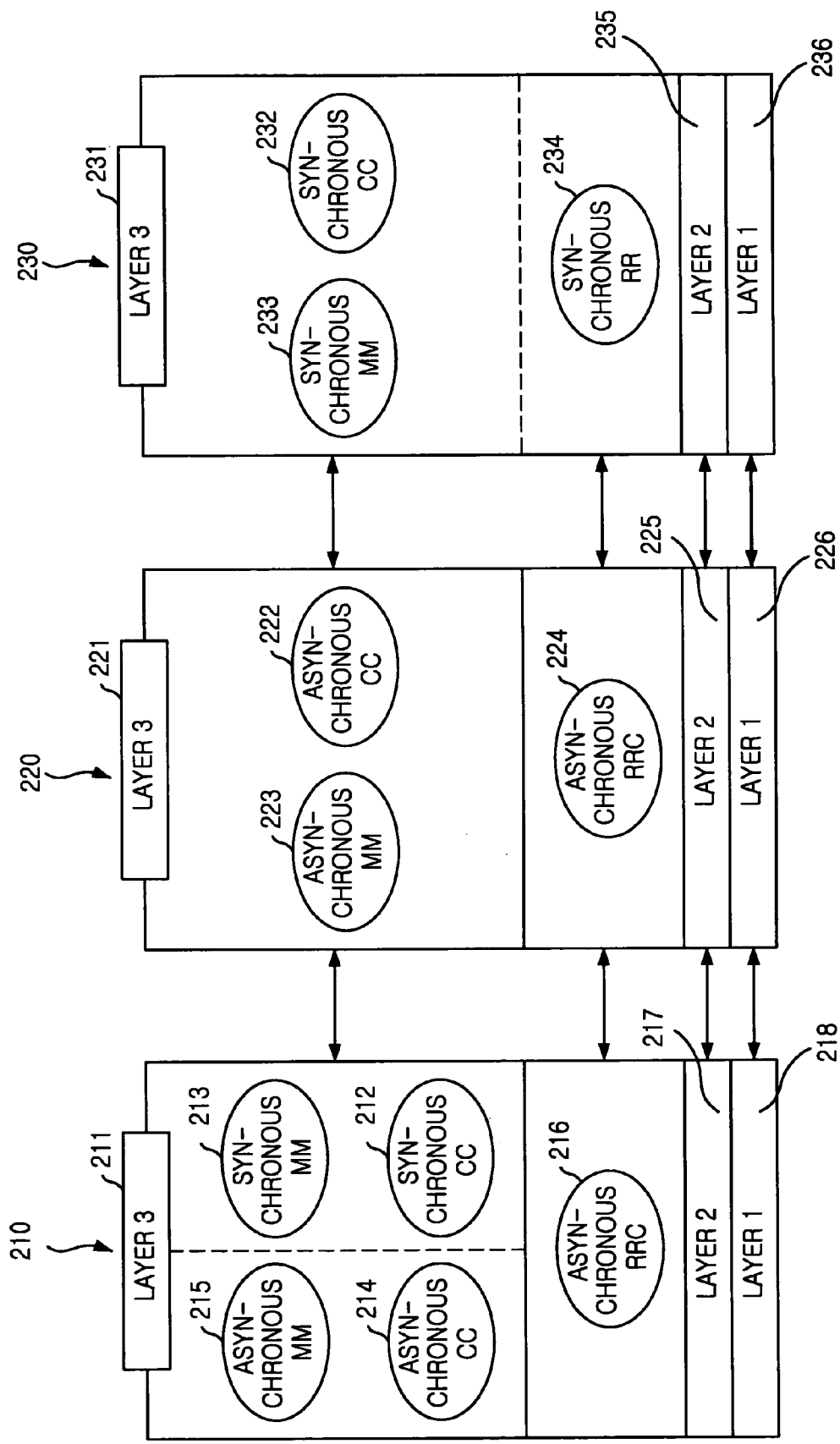

FIG. 6

| INFORMATION ELEMENT | PRESENCE | RANGE | IE TYPE AND REFERENCE | SEMANTICS DESCRIPTION |
|---|---|---|---|---|
| OTHER INFORMATION ELEMENTS | | | | |
| VALUE TAG | M | | | |
| REFERENCES TO OTHER SYSTEM INFORMATION BLOCKS | | 1..<maxSysinfo Blockcount> | | |
| | | | | |
| SCHEDULING INFORMATION | M | | | |
| CN INFORMATION ELEMENTS | | | | |
| CN TYPE | M | | Enumerated (GSM-MAP, ANSI-41, GSM-MAP AND ANSI-41) | |
| PLMN_ID | C-GSM | | | |
| ANSI-41 INFORMATION ELEMENT | C-ANSI | | | |
| P_REV | M | | | |
| MIN_P_REV | M | | | |
| SID | M | | | |
| NID | M | | | |

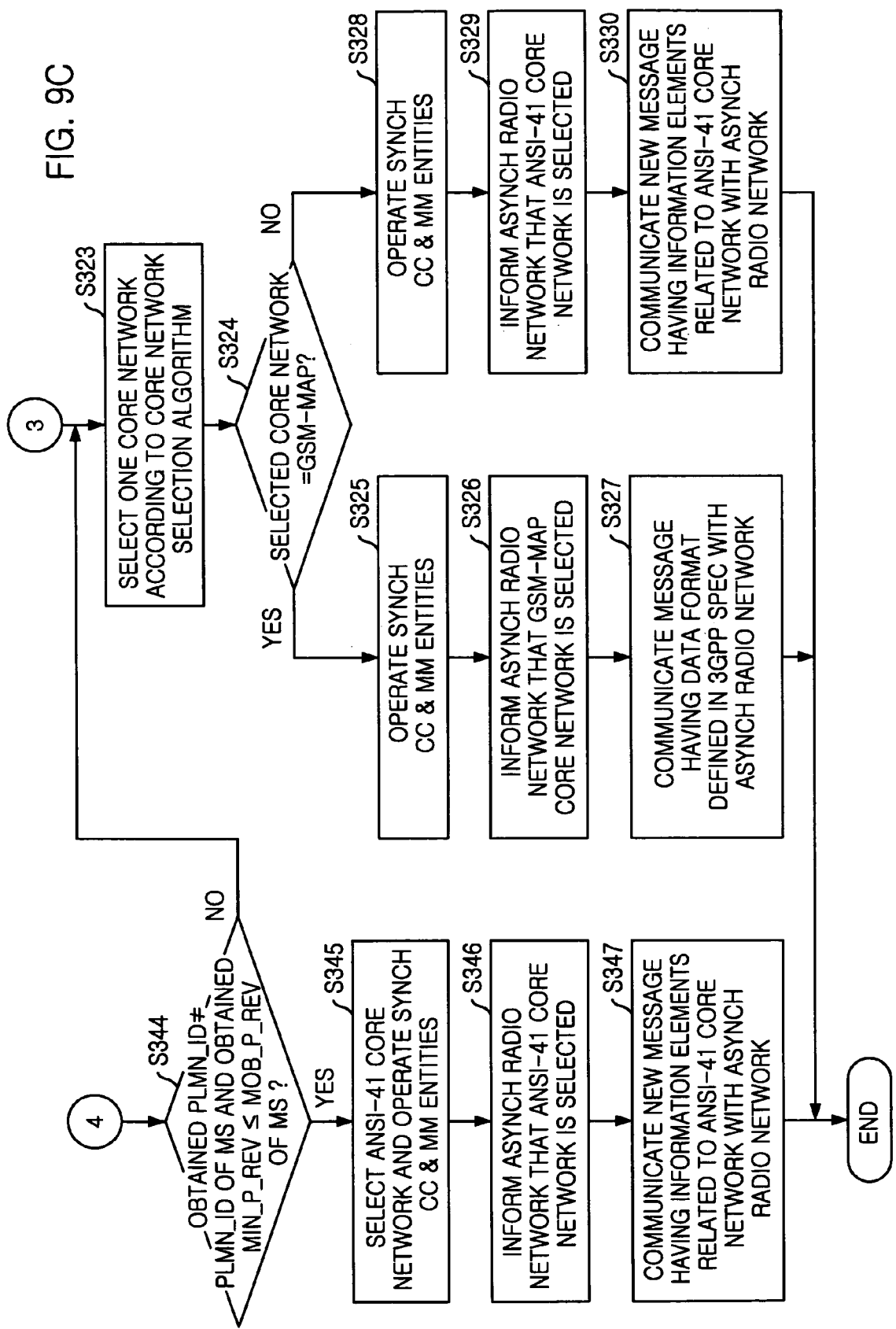

METHOD FOR INTERFACING ASYNCHRONOUS MOBILE COMMUNICATION SYSTEM WITH AT LEAST ONE CORE NETWORK

FIELD OF THE INVENTION

The present invention relates in general to a method for interfacing an asynchronous mobile communication system with a least a core network; and, more particularly to a method for interfacing an asynchronous mobile communication system with a plurality of core networks each having a different operating type.

DESCRIPTION OF THE PRIOR ART

In a conventional synchronous mobile telecommunication system, a synchronous mobile station is connected to a synchronous radio network (for example, a CDMA-2000 radio network), which is in turn connected to an ANSI-41 core network.

In a conventional asynchronous mobile telecommunications system, an asynchronous mobile station is connected to an asynchronous radio network (for example, a universal mobile telecommunication system (UMTS) terrestrial radio access network (UTRAN), which is in turn connected to a global system, for mobile-communications-mobile application part (GSM-MAP) core network.

FIG. 1A is a view showing the core network interface architecture of the conventional synchronous mobile telecommunications system. In this drawing, the reference numeral 11 denotes a synchronous mobile station, 12 denotes a synchronous radio network (i.e., a code division multiple access-2000 (CDMA-2000) radio network) which performs a data interfacing operation with the synchronous mobile station 11 and includes a synchronous base transceiver station/base station controller (BTS/BSC), and 13 denotes a synchronous core network, called ANSI-41 core network, which is connected to the synchronous radio network 12 and includes several systems such as mobile switching center (MSC) 14.

In the above core network interface architecture of the conventional synchronous mobile telecommunications system, the synchronous mobile station 11 can be connected to only the synchronous radio network 12 as well known to one skilled in the art, which is in turn connected to the synchronous core network 13, thereby allowing the synchronous mobile station 11 to be interfaced with only the synchronous core network 13.

FIG. 1B is a view showing the core network interface architecture of the conventional asynchronous mobile telecommunications system. In this drawing, the reference numeral 21 denotes an asynchronous mobile station, 22 denotes an asynchronous radio network (i.e., a UTRAN) which includes a base transceiver station (BTS) and a radio network controller (RNC), and 23 denotes an asynchronous core network, called GSM-MAP core network, which includes several systems such as mobile switching center (MSC) 24.

In the above core network interface architecture of the conventional asynchronous mobile telecommunications system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2A is a view showing the layered protocol structure of the conventional synchronous mobile telecommunications system. In this drawing, the reference numeral 30 denotes a synchronous mobile station, 40 a synchronous radio network and 50 a synchronous core network connected to the synchronous radio network 40.

The synchronous mobile station 30 includes a layer3 31, a layer2 35 and a layer1 36. The layer3 31 includes a synchronous call control (CC) entity 32 for management of a call and a synchronous mobility management (MM) entity 33 for management of a mobility.

The layer1 36 is a physical layer which offers data transport services to higher layers and transfers transport blocks over a radio interface.

The layer2 35 is a data link layer which includes following sub layers, a medium access control (MAC) sub layer and a radio link control (RLC) sub layer. However, the sub layers are not shown in this drawing.

The MAC sub layer offers data transfer services on logical channels to a higher layer (RLC sub layer) and on transport channels to a lower layer (the physical layer 36). The MAC sub layer is responsible for mapping of the logical channel onto the appropriate transports channel.

The RLC sub layer offers data transfer services on primitive to a higher layer and on logical channels to a lower layer (MAC sub layer). Also, the RLC sub layer performs an error correction, a duplicate detection, a ciphering and a flow control of the data.

The layer3 31 is a network layer which includes following sub layers, a synchronous radio resource (RR) sub layer, a synchronous call control (CC) entity 32 and a mobility management (MM) entity 33. In synchronous system, the synchronous RR sub layer is not apparently separated from the others in the layer3 31.

The RR sub layer offers data transfer services on primitive to a lower layer (RLC sub layer) and handles a control plane signaling of the layer3 31 between a user equipment (UE) and a synchronous radio network. The RR sub layer manages a radio resource. Also, the RR sub layer assigns/reconfigures/releases the radio resource to UE/UTRAN.

The CC entity handles a call control signaling of layer3 between the UEs and the synchronous radio network.

The MM entity handles a mobility management signaling of layer3 between the user equipments (UEs) and the synchronous radio network.

The layers 3 to 1 31, 35 and 36 in the synchronous mobile station 30 communicate with corresponding layers 41, 45 and 46 in the synchronous radio network 40.

The synchronous radio network 40 includes a layer3 41, a layer2 45 and a layer1 46. The layers 3 to 1 in the synchronous radio network 40 correspond respectively to those in the synchronous mobile station 30.

The layers 3 to 1 41, 45 and 46 in the synchronous radio network 40 communicate with corresponding layers 31, 35, 36, 51, 55 and 56 in the synchronous mobile station and the synchronous core network 50.

The synchronous core network 50 includes a layer3 51, a layer2 55 and a layer1 56. The layers 3 to 1 in the synchronous radio network 50 correspond respectively to those in the synchronous mobile station 30.

The layers 3 to 1 51, 55 and 56 in the synchronous core network 50 communicate with corresponding layers 41, 45 and 46 in the synchronous radio network 40.

In the conventional synchronous mobile station and radio network as the layered protocol structure, the synchronous mobile station 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous mobile station acquires system information (i.e., information related to the radio network and core network) through a system determination sub-state, a pilot channel acquisition sub-state, a Sync channel acquisition sub-state and a timing changing sub-state after it is powered on.

FIG. 2B is a view showing the layered protocol structure of the conventional asynchronous mobile telecommunications system. In this drawing, the reference numeral 60 denotes an asynchronous mobile station, 70 a UTRAN and 80 an asynchronous core network.

The asynchronous mobile station 60 includes a layer3 61, a layer2 65 and a layer1 66. In particular, the layer3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part. In the asynchronous system, the asynchronous RRC sub layer is apparently separated from the NAS part. Functions of the asynchronous RRC sub layer are the same as those of the synchronous RR sub layer.

The UTRAN 70 includes a layer3 71, a layer2 73 and a layer1 74. The layer3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are coupled to each other not through the UTRAN 70.

The asynchronous core network 80 includes a layer3 having a NAS part 81 connected to that of the asynchronous mobile station 60 and a AS part, a layer2 85 and a layer1 86 connected respectively to those in the UTRAN 70. The NAS part includes an asynchronous CC part 82 for management of a call and an asynchronous MM part 83 for management of a mobility.

Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in 3$^{rd}$ Generation Partnership Project (3GPP), Technical Specification Group (TSG) —Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

The synchronous mobile station 30 receives a synchronous channel message through a synchronous channel from the synchronous radio network 40, and obtains information necessary for connecting the mobile station to the core network, from the synchronous channel message. The synchronous channel message includes information related to the synchronous radio network and a core network connected thereto.

The asynchronous mobile station 60 receives a system information message through a broadcast channel (BCCH), and obtains information necessary for connecting the mobile station to the core network, from the system information message. The system information message includes information related to the asynchronous radio network and a core network connected thereto.

IMT-2000 systems are the third generation systems which aim to unify the various mobile communication networks and services into one to provide many mobile communication services. The systems can provide multimedia services under multi-environments through various air-interfaces and high capacity. Also, in the aspect of services, the systems can provide multimedia services of speech, image and data up to the rate of 2 Mbps and an international roaming. And, in the aspect of network, the systems are total systems which are based on ATM networks and combine fixed and wireless systems.

IMT-2000 system requires new system concept, high-level adaptation technology, and novel network technology, as well all conventional technologies which were already adopted in the second digital cellular system.

As described above, in the next-generation mobile telecommunication system such as the IMT-2000 system, either the GSM-MAP network used in the above conventional asynchronous mobile telecommunications system or the ANSI-41 network used in the above conventional synchronous mobile telecommunications system should be employed as a core network in order to perform an international roaming in a synchronous or asynchronous mobile telecommunications system of an IMT-2000 system.

According to network deployment scenarios, the IMT-2000 system can have the following four interface architectures; first: synchronous mobile station—synchronous radio network—synchronous ANSI-41 network, second: synchronous mobile station—synchronous radio network—asynchronous GSM-MAP network third: asynchronous mobile station—asynchronous radio network—synchronous ANSI-41 network and fourth: asynchronous mobile station—asynchronous radio network—asynchronous GSM-MAP network.

The IMT-2000 system has the four interface architectures as mentioned above. Therefore, the hybrid type synchronous mobile station must recognize an operating type of a core network currently connected thereto, and the hybrid type synchronous radio network should provide core network operating type information and others information to the hybrid type synchronous mobile station. The core network operating type information and the others information must be contained in the Sync channel message that the synchronous mobile station, after being powered on, receives through the Sync channel in the above-mentioned conventional interfacing manner.

Similarly, the hybrid type asynchronous mobile station must recognize an operating type of a core network currently connected thereto, and the hybrid type asynchronous radio network should provide the core network operating type information and others information to the hybrid type asynchronous mobile station. The core network operating type information and the others information must be contained in the system information message transmitted to the asynchronous mobile station, after being powered on, so that the asynchronous mobile station receives through the broadcast control channel (BCCH) in the above-mentioned conventional interfacing manner.

FIG. 3A is a view showing a synchronous ANSI-41 core network interface architecture of a hybrid type synchronous radio network. In this drawing, the reference numeral 100 denotes a hybrid type synchronous mobile station, 110 a hybrid type synchronous radio network, and 120 a synchronous core network.

FIG. 3B is a view showing an asynchronous GSM-MAP core network interface architecture of the hybrid type synchronous radio network. In this drawing, the reference numeral 100 denotes a hybrid type synchronous mobile station, 110 a hybrid type synchronous radio network, and 130 an asynchronous core network.

FIG. 3C is a view showing an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes a core network which is connected to the hybrid type UTRAN 220.

FIG. 3D is a view showing a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a core network which is connected to the hybrid type UTRAN 220.

In order to be operable adaptively to the above four interface architectures, each of the hybrid type synchronous and asynchronous mobile stations in the next-generation mobile telecommunications system has both asynchronous CC and MM protocol entities serving for the GSM-MAP core network and synchronous CC and MM protocol entities serving for the ANSI-41 core network at the layer3 in the protocol stack structure, which is a different from each of the conventional synchronous and asynchronous mobile stations.

FIG. 4A is a view showing the layered protocol structure of a hybrid type synchronous mobile station, a hybrid type synchronous radio network and the synchronous ANSI-41 core network. In this drawing, the reference numeral 100 denotes a hybrid type synchronous mobile station, 110 denotes a hybrid type synchronous radio network, and 120 denotes an ANSI-41 core network which is a synchronous core network connected to the hybrid type synchronous radio network 110.

The hybrid type synchronous mobile station 100 includes a layer3 101, a layer2 107 and a layer1 108. The layer3 101 includes a synchronous CC part 102, a synchronous MM part 103, an asynchronous CC part 104, an asynchronous MM part 105 and a synchronous radio resource part 106. The hybrid type synchronous mobile station 100 selectively makes a CC/MM protocol active according to a core network operating type. Information for identifying the core network operating type is given to the hybrid type synchronous mobile station 100.

For example, if the hybrid type synchronous mobile station 100 is currently connected to the ANSI-41 core network 120, the layer3 101 therein activates protocols of the synchronous CC part 102 and synchronous MM part 103 to perform a message interfacing operation with the ANSI-41 core network 120.

The hybrid type synchronous radio network 110 includes a layer3 111, a layer2 115 and a layer1 116, which activate their protocols corresponding respectively to those in the hybrid type synchronous mobile station 100 and those in the ANSI-41 core network 120 to transmit and receive messages.

The ANSI-41 core network 120 includes a layer3 121, a layer2 125 and a layer1 126. The layer3 121 includes a synchronous CC part 122, a synchronous MM part 123 and a synchronous RR part 124.

On the other hand, a hybrid type synchronous mobile station, a hybrid type synchronous radio network and an asynchronous core network have layered protocol structures as shown in FIG. 4B when the core network connected thereto is of an asynchronous operating type as shown in FIG. 3B.

In FIG. 4B, the reference numeral 100 denotes a hybrid type synchronous mobile station, 110 denotes a hybrid type synchronous radio network, and 130 denotes a GSM-MAP core network which is an asynchronous core network.

The hybrid type synchronous mobile station 100 includes a layer3 101 having a NAS part and an AS part, a layer2 107 and a layer1 108. The NAS part includes a synchronous CC part 102, a synchronous MM part 103, an asynchronous CC part 104 and an asynchronous MM part 105. The AS part includes a synchronous RR part 106. The hybrid type synchronous mobile station 100 selectively makes a CC/MM protocol active according to a core network operating type.

For example, if the hybrid type synchronous mobile station 100 is currently connected to the GSM-MAP core network 130, the layer3 101 therein activates protocols of the asynchronous CC part 104 and asynchronous MM part 105 to perform a message interfacing operation with the GSM-MAP core network 130.

The hybrid type synchronous radio network 110 includes a layer3 111 having a NAS part and an AS part, a layer2 115 and a layer1 116, which activate their protocols corresponding respectively to those in the hybrid type synchronous mobile station 100 and those in the GSM-MAP core network 130 to transmit and receive messages.

The GSM-MAP core network 130 includes a layer3 131 having a NAS part and an AS part, a layer2 135 and a layer1 136. The NAS part includes an asynchronous CC part 132 and an asynchronous MM part 133. The AS part includes an asynchronous RRC part 134.

The layers 3 to 1 of the hybrid type synchronous radio network 110 are connected and correspond respectively to those in the hybrid type synchronous mobile station 100 and those in the asynchronous core network 130. However, the NAS parts of the hybrid type asynchronous mobile station 100 and the asynchronous core network 130 are coupled to each other not through the hybrid type synchronous mobile station 110.

FIG. 4C is a view showing layered protocol structures of a hybrid type asynchronous mobile station, a hybrid type synchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 includes a layer3 211, a layer2 217 and a layer1 218. The layer1 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer1 therein activates a protocol between the synchronous CC part 211 and synchronous MM part 212 to perform a message interfacing operation with the ANSI-41 core network 230.

FIG. 4D is a view showing layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes hybrid type a UTRAN which is a hybrid type asynchronous radio network, and 240 denotes an asynchronous GSM-MAP core network connected to the hybrid type UTRAN 220.

The hybrid type asynchronous mobile station 210 includes a layer3 211 having a NAS part and an AS part, a layer2 217 and a layer1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type synchronous radio network 210 includes a layer3 211 having a NAS part and an AS part, a layer2 225 and a layer1 226, which activate their protocols corresponding respectively to those in the hybrid type synchronous mobile station 210 and those in the GSM-MAP core network 240 to transmit and receive messages.

The GSM-MAP core network 240 includes a layer3 241 having a NAS part and an AS part, a layer2 245 and a layer1 246. The NAS part includes an asynchronous CC part 242 and an asynchronous MM part 243. The AS part includes an asynchronous RRC part 244.

For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type synchronous radio network 220 are connected and correspond respectively to those in the hybrid type synchronous mobile station 210 and those in the asynchronous core network 240. However, the NAS parts of the hybrid type asynchronous mobile station 210 and the asynchronous core network 240 are coupled to each other not through the hybrid type asynchronous mobile station 220.

A communication protocol between a synchronous mobile station and a synchronous mobile network is referred to an Air-interface protocol. For example, an Interim Standard (IS)-2000 protocol is used as the Air-interface protocol.

A communication protocol between a synchronous mobile network and a synchronous core network, for example, an ANSI-41 network is referred to an A-interface protocol. For example, a third generation interoperability specification (3G-IOS) is used as the A-interface protocol.

The IMT-2000 system has the four interface architectures as mentioned above. Therefore, the synchronous mobile station must recognize an operating type of a core network currently connected thereto, and the synchronous radio network should provide core network operating type information and others information to the synchronous mobile station. The core network operating type information and the others information must be contained in the Sync channel message that the synchronous mobile station, after being powered on, receives through the Sync channel in the above-mentioned conventional interfacing manner.

Similarly, the hybrid type asynchronous mobile station must recognize an operating type of a core network currently connected thereto, and the asynchronous radio network should provide the core network operating type information and others information to the asynchronous mobile station. The core network operating type information and the others information must be contained in the system information message transmitted to the asynchronous mobile station, after being powered on, so that the asynchronous mobile station receives through the broadcast control channel (BCCH) in the above-mentioned conventional interfacing manner.

The asynchronous radio network can recognize the operating type of the core network by communicating a message with the core network or by a hardware device including a dip switch. The asynchronous radio network inserts the core network type information into a predetermined location of a system information message and transmits the system information message to the asynchronous mobile station, so that the asynchronous mobile station operates a call control (CC) entity and a mobility management (MM) entity based on the core network type information. For example, the predetermined location is a master information block in which information for a control and a scheduling of a system information block is written. The master information block is necessarily included in the system information message.

However, the asynchronous mobile station can be coupled to two or more core networks each having a different operating type. For example, both of the asynchronous GSM-MAP core network and the synchronous ANSI-41 core network can be coupled to the asynchronous mobile communication system.

When the mobile communication system is coupled to two core networks each having a different operating type, the asynchronous radio network should transmit both kinds of the core network type information to the asynchronous mobile station. In order to communicating between the asynchronous mobile communication system and the core network, one core network should be selected by the asynchronous mobile communication system. In other words, one of the asynchronous radio network or the asynchronous mobile station should select one of the core networks. At this time, it is more efficient that the mobile station selects, because the asynchronous radio network does not know capabilities of the asynchronous mobile station.

It is more efficient that the core network is selected by the asynchronous mobile station based on coverage and kinds of services provided by the mobile station and radio environments between the mobile station and the radio network.

one of the core networks. The reason to communicate therewith based on the received core network type information the asynchronous mobile station should select one core network to communicate therewith based on the received core network type information.

However, in the prior art, there is no method for selecting a core network, at the asynchronous mobile station, when a plurality of core networks each having a different operating type are coupled to the asynchronous mobile station. Accordingly, there is a problem in that the asynchronous mobile station cannot be interfaced with the core network.

SUMMARY OF THE INVENTION

Therefore, the present invention has been made in view of the above problems, and it is an object of the present invention to provide a method for interfacing an asynchronous mobile communication system and a core network, wherein the asynchronous mobile communication system is coupled to at least two core networks each having a different operating type.

In accordance with one aspect of the present invention, there is provided a method for a method for transmitting a message between a mobile communication system and at least a core network, the mobile communication system having a mobile station and a radio network, the method comprising the steps of: a) at the radio network, discriminating an operating type of a core network(s) coupled thereto; b) at the radio network, generating and transmitting a system information message having core network operating type information and information related to the core network; c) if two or more core networks are coupled to the asynchronous mobile communication system, at the mobile station, selecting one core network to be communicated with, based on the system information message; d) operating a call control entity and a mobility management entity according to an operating type of the selected core network; and e) communicating messages between the mobile station and the radio network, the message having a different data format according to the operating type of the selected core network.

BRIEF DESCRIPTION OF THE DRAWINGS

The above and other objects, features and advantages of the present invention will be more clearly understood from the following detailed description taken in conjunction with the accompanying drawings, in which:

FIG. 2B is a view showing a layered protocol structure of the conventional asynchronous mobile telecommunications system;

FIG. 4A is a view showing layered protocol structures of hybrid type synchronous mobile station and radio network and the synchronous ANSI-41 core network;

FIG. 4B is a view showing layered protocol structures of hybrid type synchronous mobile station and radio network and the asynchronous GSM-MAP core network;

FIG. 4C is a view showing layered protocol structures of hybrid type asynchronous mobile station and radio network and the synchronous ANSI-41 core network;

FIG. 6 is a view showing data structure of a master information block included in a system information message;

FIGS. 9A to 9C are flow charts illustrating a method for interfacing a message at an synchronous mobile station in accordance with another embodiment of the present invention.

DETAILED DESCRIPTION OF THE PREFERRED EMBODIMENTS

Hereinafter, the preferred embodiments of the present invention will be described in detail with reference to the accompanying drawings.

Figure 1A:
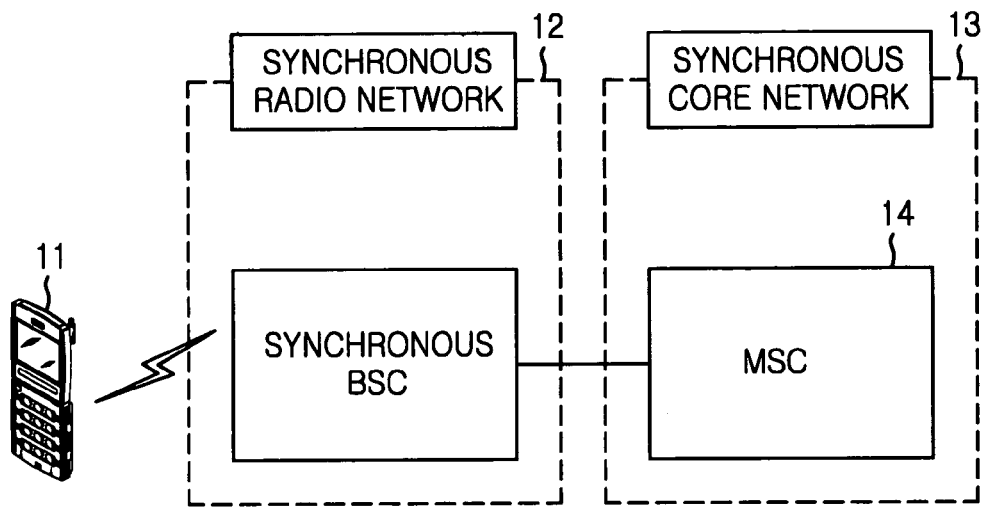
FIG. 1A is a view showing a core network interface architecture of the conventional synchronous mobile telecommunications system.
Figure 1B:
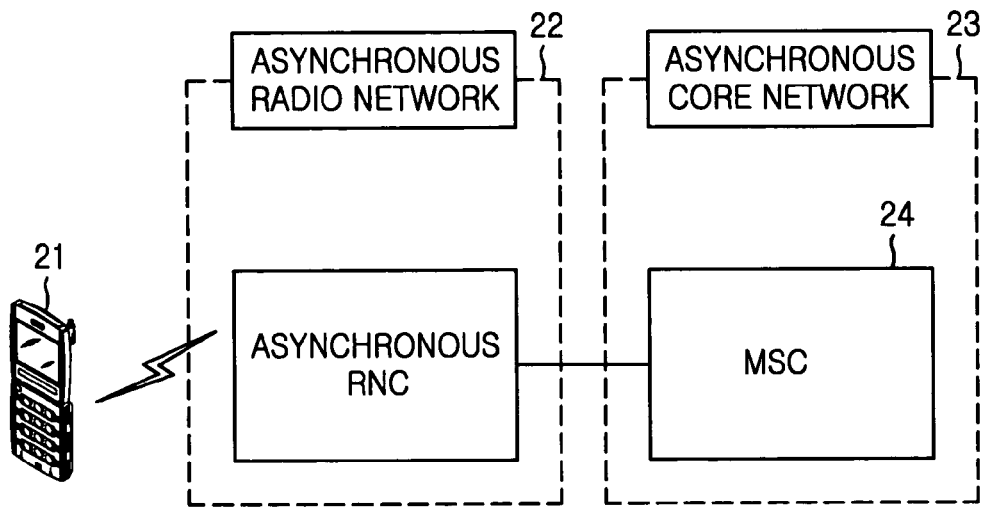
FIG. 1B is a view showing a core network interface architecture of the conventional asynchronous mobile telecommunications system.
Figure 2A:
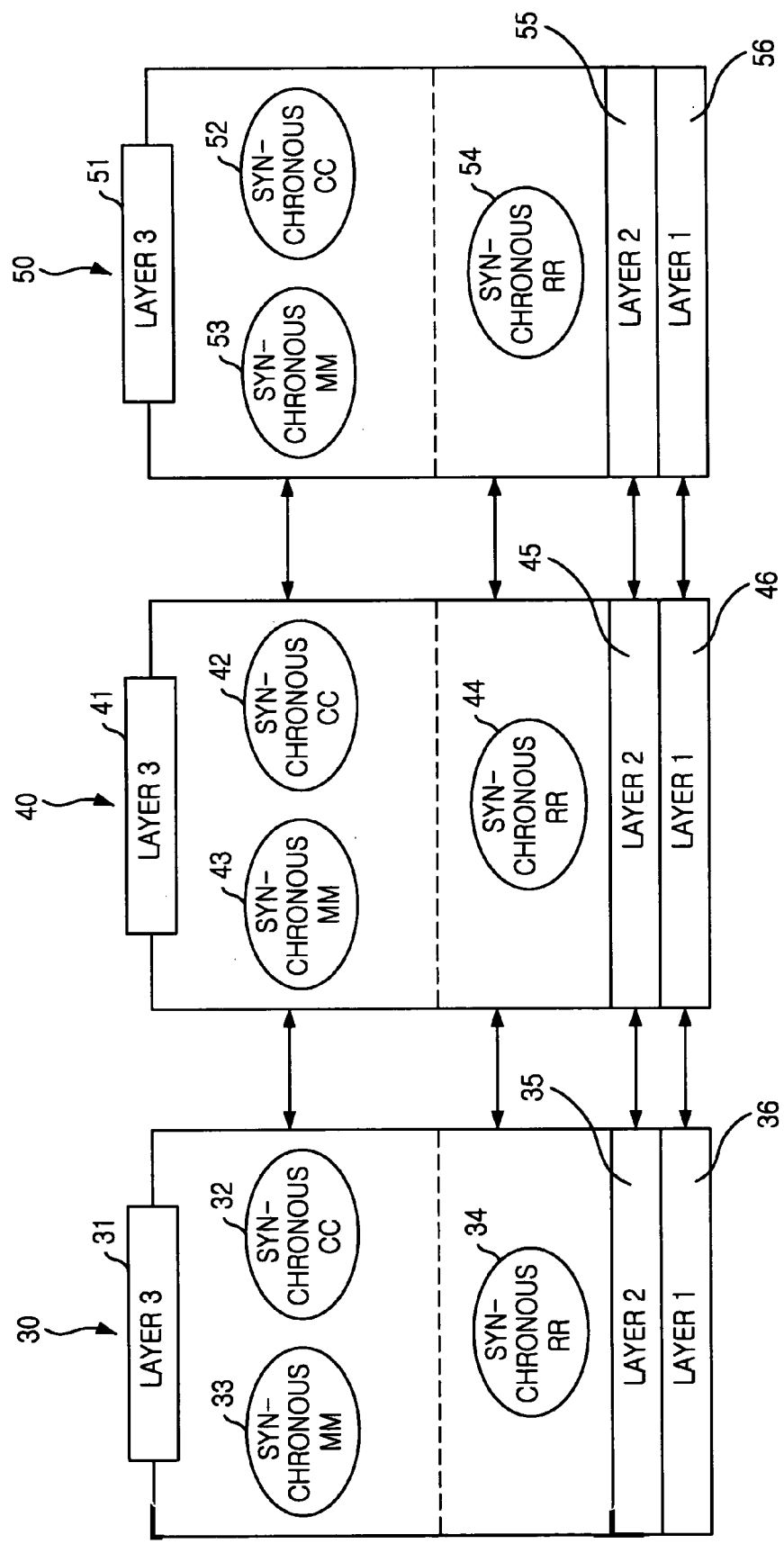
FIG. 2A is a view showing a layered protocol structure of the conventional synchronous mobile telecommunications system.
Figure 3A:
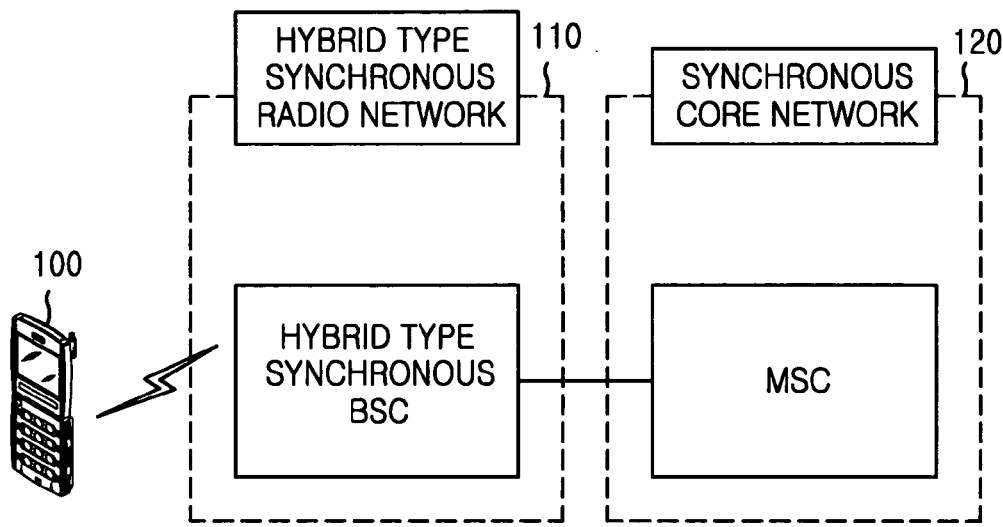
FIG. 3A is a view showing a synchronous ANSI-41 core network interface architecture of hybrid type synchronous mobile station and radio network.
Figure 3B:
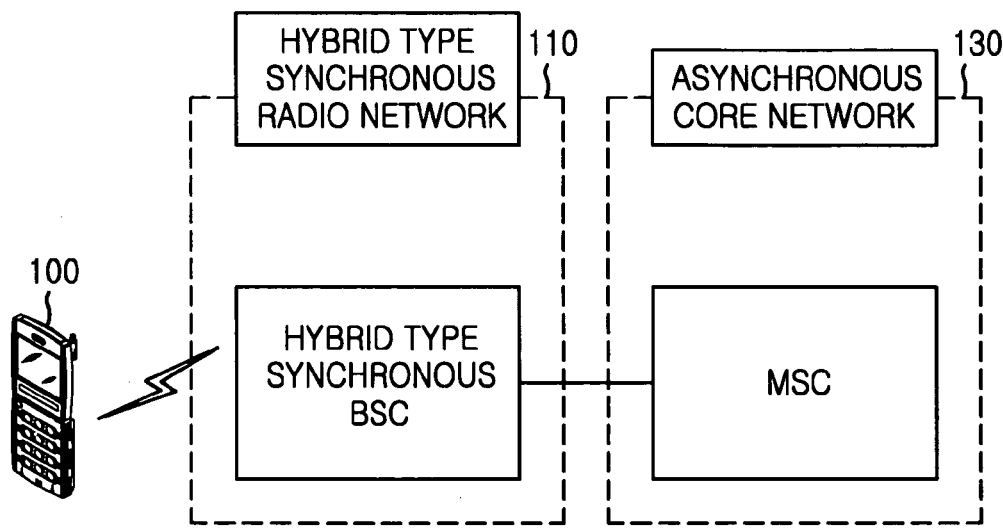
FIG. 3B is a view showing an asynchronous GSM-MAP core network interface architecture of hybrid type synchronous mobile station and radio network.
Figure 3C:
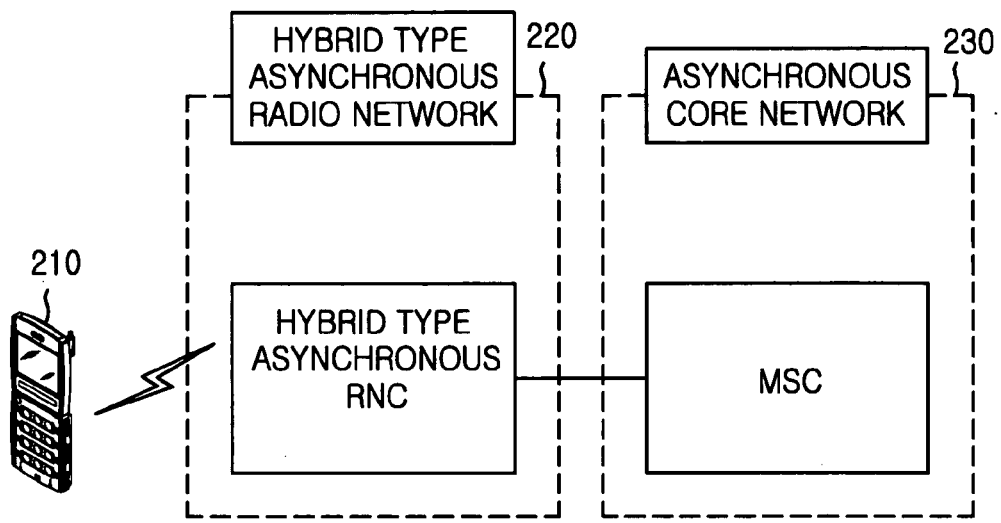
FIG. 3C is a view showing an asynchronous GSM-MAP core network interface architecture of hybrid type asynchronous mobile station and radio network.
Figure 3D:
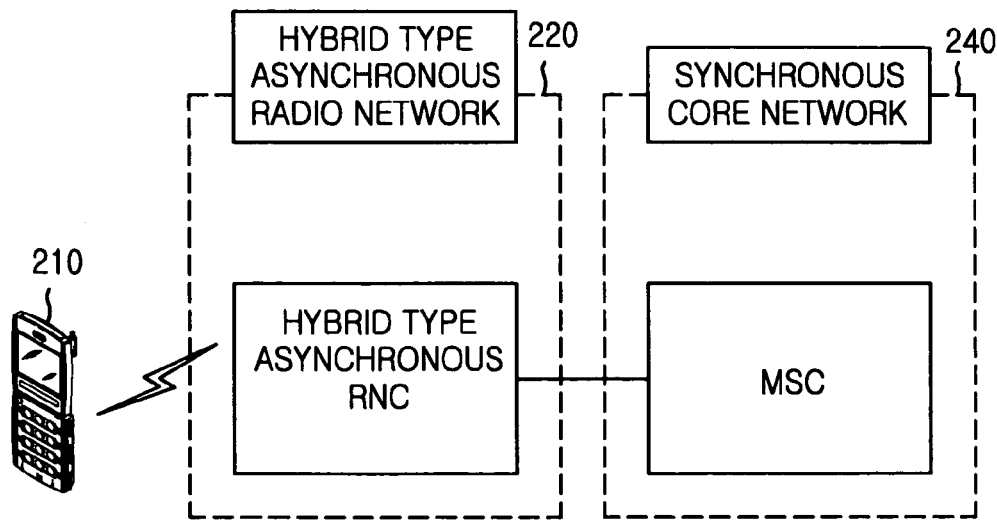
FIG. 3D is a view showing a synchronous ANSI-41 core network interface architecture of hybrid type asynchronous mobile station and radio network.
Figure 4D:
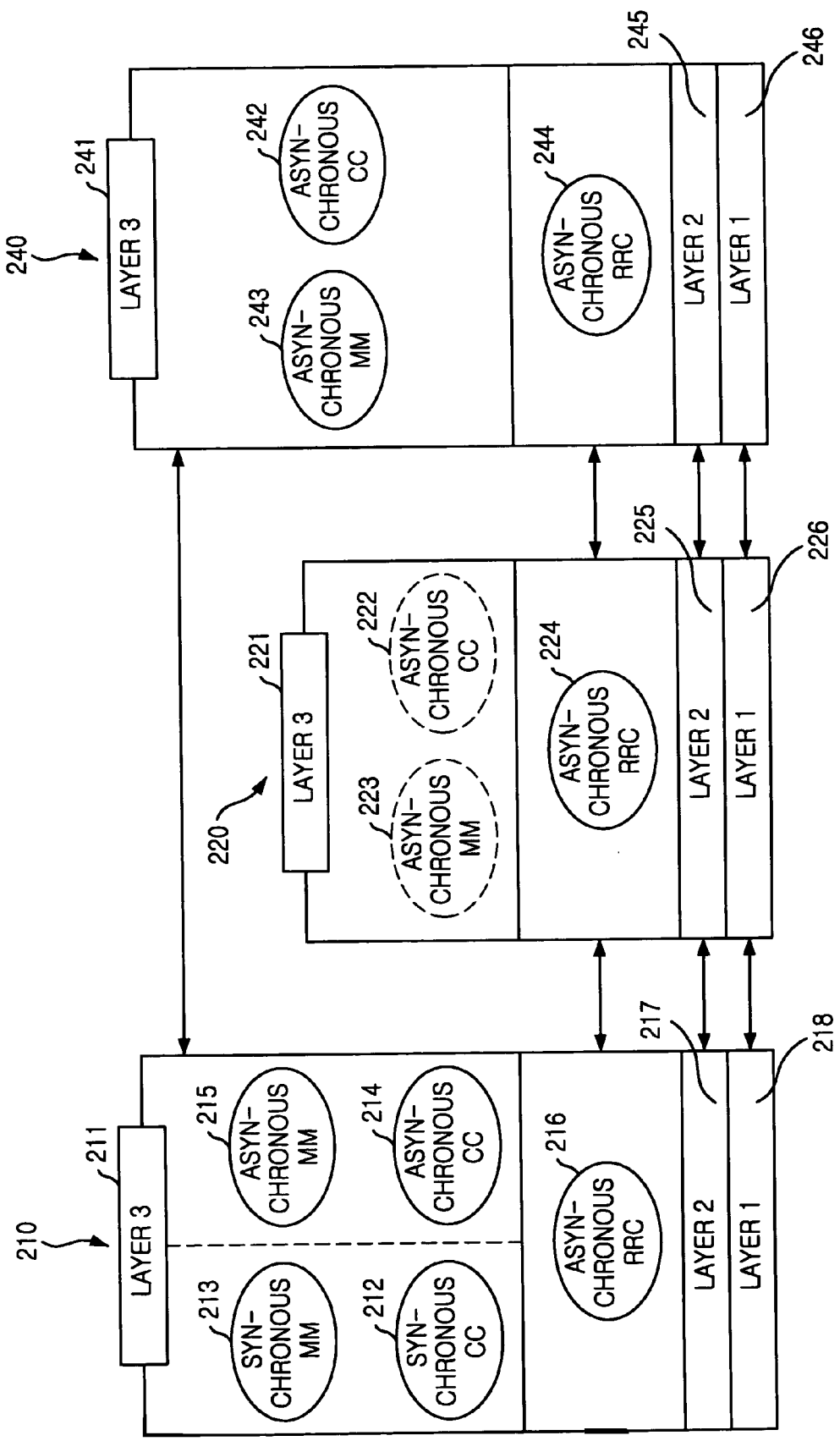
FIG. 4D is a view showing layered protocol structures of hybrid type asynchronous mobile station and radio network and the asynchronous GSM-MAP core network.
Figure 5:
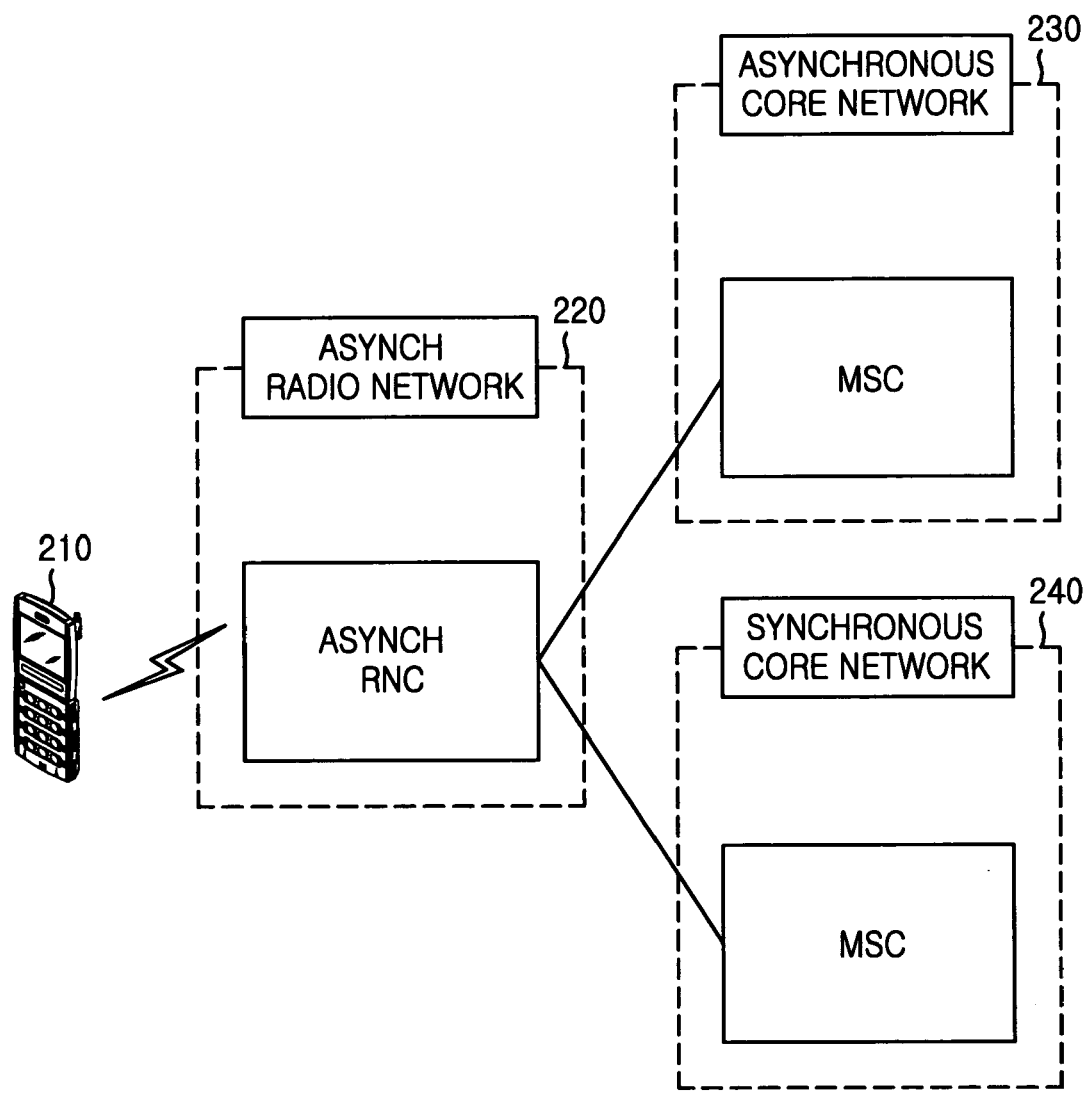
FIG. 5 is a view showing an interface architecture of an asynchronous mobile station, an asynchronous radio network and two core networks each having a different operating type.

FIG. 5 is a view showing an interface architecture of an asynchronous mobile station, an asynchronous radio network and two core networks each having a different operating type.

Reference numerals 210, 220, 230 and 240 denote an asynchronous mobile station, an asynchronous radio network, an asynchronous core network and a synchronous core network, respectively.

In order to adaptively set a protocol based on an operating type of the core network 230 or 240 connected thereto, the asynchronous radio network 220 should discriminate an operating type of a core network connected thereto and transmit core network operating type information and information relating to the core network to the asynchronous mobile station 210. Also, the asynchronous radio network 220 converts a data format of a message received from the asynchronous mobile station 210 based on the operating type of the selected core network, and transmits the converted message to the selected core network.

The asynchronous mobile station obtains information related to the core network from a master information block of a system information message broadcasted through a broadcast channel (BCCH) from the asynchronous radio network. The master information block is illustrated in FIG. 6.

FIG. 6 is a view showing data structure of a master information block included in a system information message.

The master information block of the system information message includes information elements related to a core network, in detail, a core network (CN) type information element, a public land mobile network (PLMN) identity element, a protocol revision (P_REV) element, a minimum protocol revision (MIN_P_REV) element, a system identity element (SID) and a network identity element (NID).

These information elements mentioned above are important for the asynchronous mobile station. Accordingly, the information elements are included in the master information block of the system information message periodically broadcasted.

The CN type information element represents the operating type of the core network connected to the asynchronous mobile communication system. The CN type information element includes CN operating type information representing the operating type of the core network. In case that the core network is the GSM-MAP core network, the CN operating type information is set as "0" in this specification. In case of the ANSI-41 core network, the CN operating type information is set as "1". In case that both of the GSM-MAP and the ANSI-41 core network are coupled to the mobile communication system, the CN operating type information is set as "0 & 1".

The PLMN identity, which is related to the GSM-MAP core network, means an identity representing networks for the IMT-2000 system. The PLMN identity includes a mobile country code (MCC) indicating a nature or an area to which the asynchronous mobile station belongs, and a mobile network code indicating a network to which the asynchronous mobile station belongs.

The P_REV, the MIN_P_REV, the NID and the SID elements are related to the ANSI-41 core network.

The protocol revision element P_REV means a protocol revision of a call control (CC) and a mobility management (MM) entities of the ANSI-41 core network. The minimum protocol revision element MIN_P_REV means a minimum protocol revision of the CC and the MM entities admitted.

The asynchronous mobile station receives the P_REV, the MIN_P_REV, the NID and the SID from the master information block of the system information message, and compares the MIN_P_REV with a mobile protocol revision (MOB_P_REV) stored on a memory or a user subscriber identity module. The asynchronous mobile station, based on the comparison result, determines whether the ANSI-41 core network can be selected.

Here, the MOB_P_REV means a protocol revision of a CC entity and a MM entity in the asynchronous mobile station.

If the CN operating type information indicates the asynchronous GSM-MAP and synchronous ANSI-41 core network, the asynchronous mobile station selects one core network based on a core network selection algorithm stored on the mobile station. The core network selection algorithm selects one core network according to a charging system, a capability of the mobile station, a capability of the asynchronous mobile communication system selected by the mobile station and environments of the asynchronous radio network. The core network selection algorithm is stored in a memory or a user subscriber identity module of the mobile station.

For example, if the capability of the mobile station is used for selecting the core network, a number of transmission channels provided by the mobile station, a transmission power of the mobile station, kinds of systems supported by the mobile station, an occupied frequency band and kinds of services are considered.

The selection of the core network should be performed before setting a RRC connection, the information related to the selected core network should be transmitted to the asynchronous radio network. For interfacing the mobile station with the radio network, the RRC connection should be performed. The RRC connection setting means that the mobile station communicates messages with the radio station based on the operating type of the selected core network.

Figure 7A:
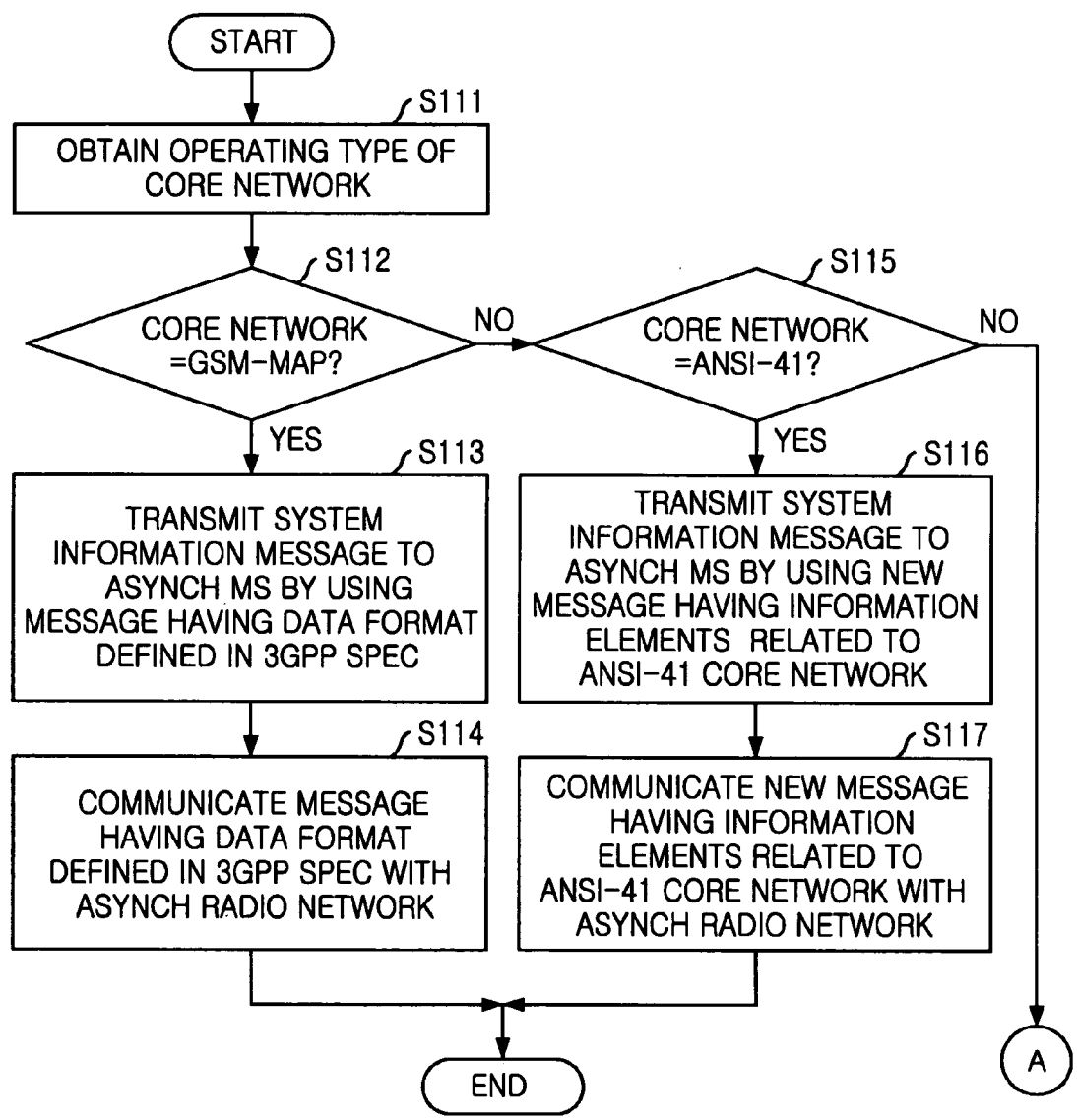
FIGS. 7A and 7B are flow charts illustrating a method for interfacing a message at an asynchronous radio network in accordance with the present invention.
Figure 7B:
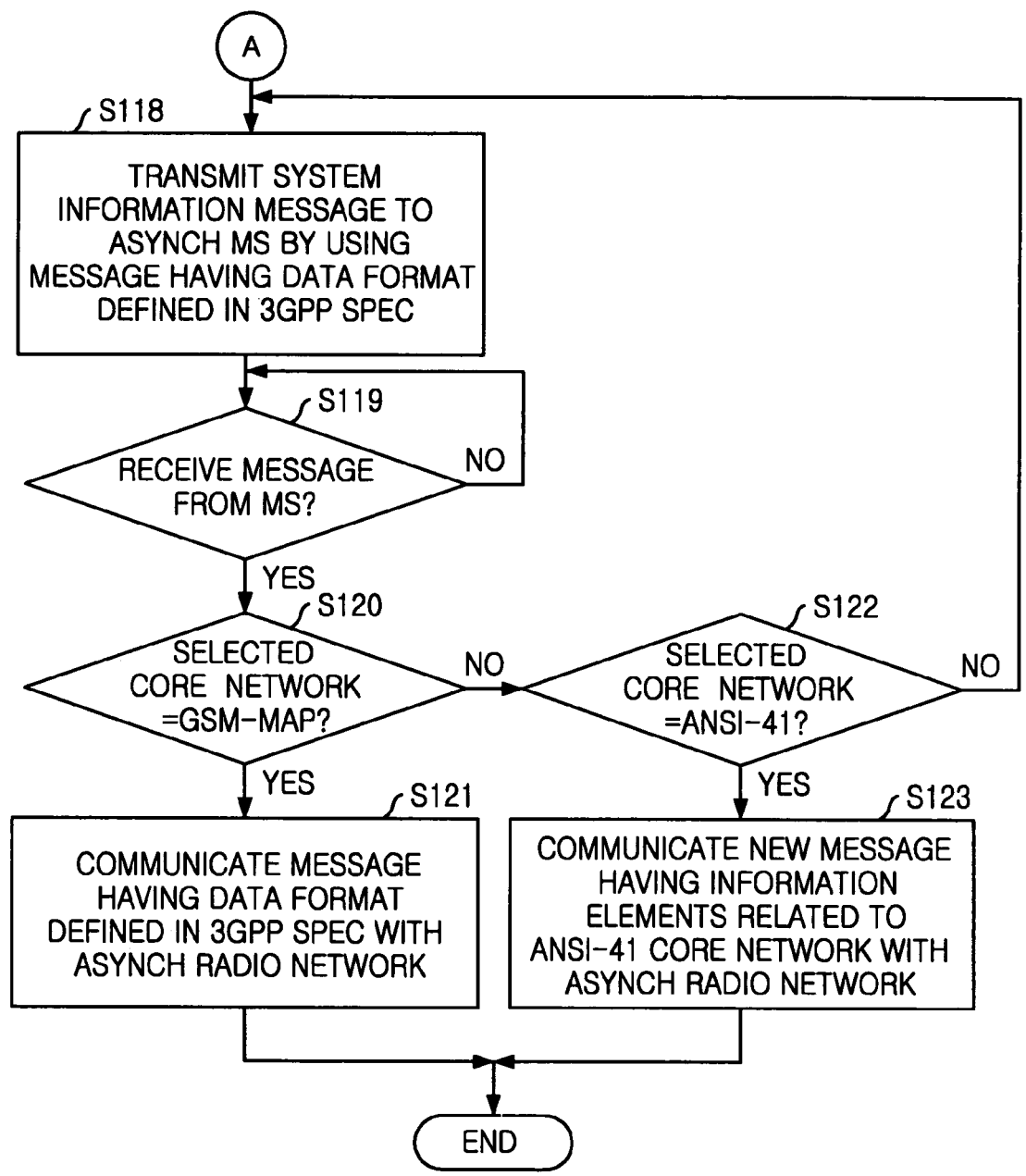

FIGS. 7A and 7B are flow charts illustrating a method for interfacing a message at an asynchronous radio network in accordance with the present invention.

An asynchronous radio network 220 detects an operating type of a core network connected thereto at step S111. In other words, the asynchronous radio network 220 obtains a CN operating type information indicating that the core network connected thereto is an asynchronous core network or a synchronous core network.

In order to obtain the operating type of the core network, a hardware device or a management/maintenance message is used. In other words, the asynchronous radio network discriminates the operating type of the core network based on information stored on a dip switch or a read only memory (ROM) at a system install, or based on information in the management/maintenance message received from the core network. Also, both of two methods can be used for obtaining the operating type of the core network.

At step S112, it is determined whether the core network is a GSM-MAP core network or an ANSI-41 core network.

If the core network is a GSM-MAP, a system information message defined in the present 3GPP specification is transmitted to the asynchronous mobile station 210 at step S113.

In the system information message of this specification, if the core network is the GSM-MAP core network, the CN operating type information is written as "0" and the CN operating type information and information related to the core network are inserted. In other words, if the core network connected the asynchronous radio network is the GSM-MAP core network, the CN operating type information in a core network (CN) information elements field is set as "0", a public land mobile network (PLMN) identity, a core network (CN) domain identity and non-access stratum (NAS) system information are written in the information related to the core network. An information element category field and an UTRAN mobility information elements filed are also written the information related to the core network.

The asynchronous radio network communicates a message having a data format defined in the 3GPP specification with the asynchronous mobile station at step S114.

On the contrary, if the core network is not the GSM-MAP core network, it is determined whether the core network is the ANSI-41 core network at step S115. If the core network is the ANSI-41 core network, a new system information message is generated and transmitted to the asynchronous mobile station at step S116. The new system information message includes new information elements related to the ANSI-41 core network. In the new system information message, the CN operating type information is set as "1", a protocol revision level (P_REV), a minimum protocol revision level (MIN_P_REV), a system identification (SID) and a network identification (NID) are written as the information related to the core network.

An information element category field and an UTRAN mobility information elements filed, which are the same as those in the conventional system information message, are also written the information related to the core network.

At step S117, messages having new information elements related to the synchronous ANSI-41 core network are communicated between the asynchronous mobile station and the asynchronous radio network.

If the core network is not the ANSI-41 core network, at determination result of the step S115, it is determined that a plurality of core networks each having a different operating type are coupled to the asynchronous radio network. In this specification, it is assumed that the synchronous ANSI-41 core network and the asynchronous GSM-MAP core network. A new system information message defined in the 3GPP specification is transmitted to the asynchronous mobile station.

In the new system information the CN operating type information is written as "0 & 1",and the CN operating type information and information related to the core networks are inserted.

It is determined whether a message is received from the asynchronous mobile station at step S119. In the received message, information related to a core network selected by the asynchronous mobile station is included.

After receiving the message, at step S120, the asynchronous radio network determines whether the selected core network is a GSM-MAP core network or an ANSI-41 core network. If the selected core network is the GSM-MAP core network, the asynchronous radio network communicates a message having a data format defined in the 3GPP specification with the asynchronous mobile station at step S121. After this time, the asynchronous radio network is interfaced with the GSM-MAP core network.

If the selected core network is not the GSM-MAP core network, at step S122, it is determined whether the selected core network is the ANSI-41 core network.

If the selected core network is the ANSI-41 core network, a new system information message having new information elements related to the ANSI-41 core network is generated and transmitted to the asynchronous mobile station at step S123. After this time, the asynchronous radio network is interfaced with the ANSI-41 core network.

If the selected core network is neither the GSM-MAP core network nor the ANSI-41 core network, the process continues to the step S116 to transmit the system information message to the asynchronous mobile station.

Figure 8A:
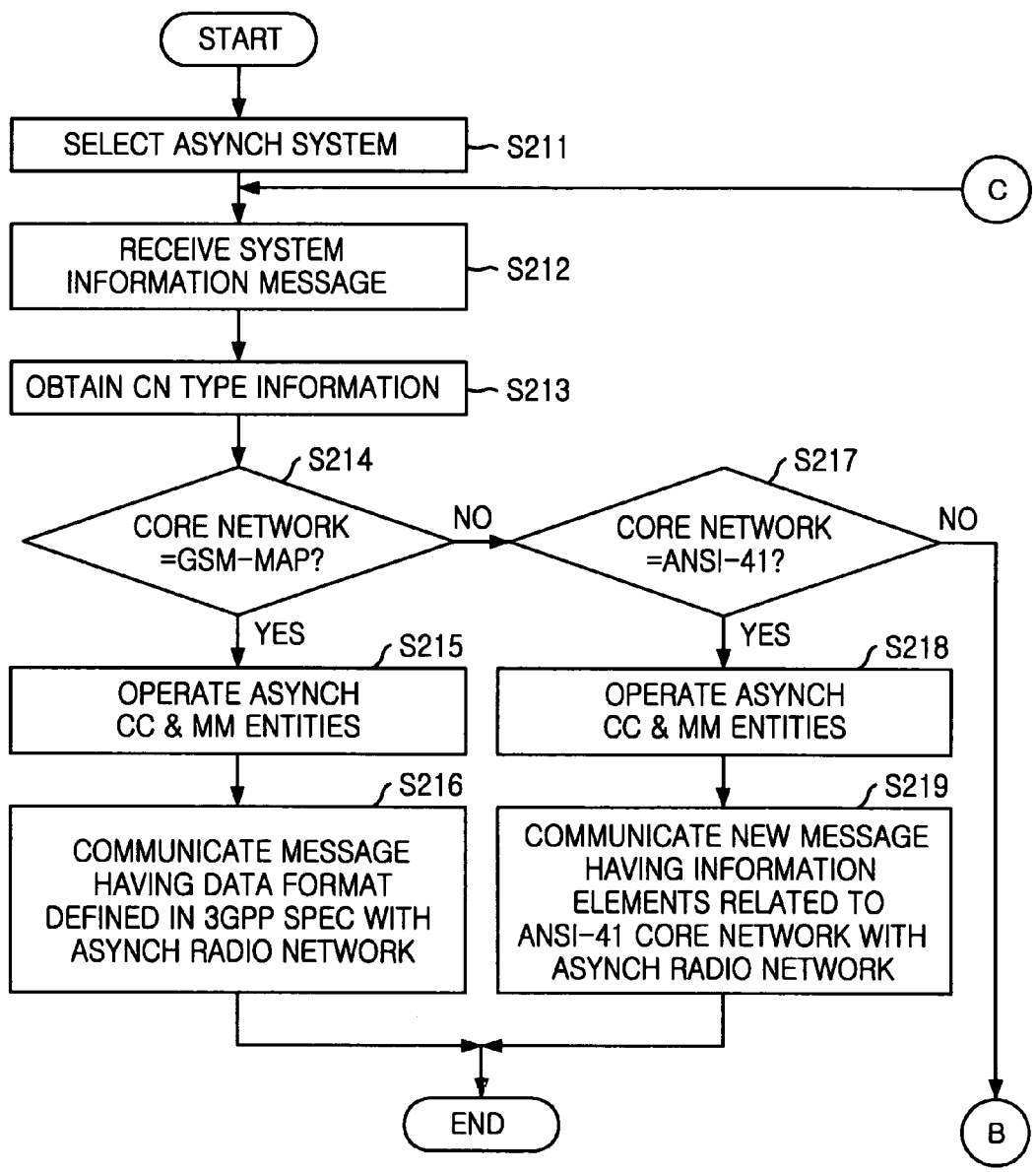
FIGS. 8A and 8B are flow charts illustrating a method for interfacing a message at an asynchronous mobile station in accordance with an embodiment of the present invention.
Figure 8B:
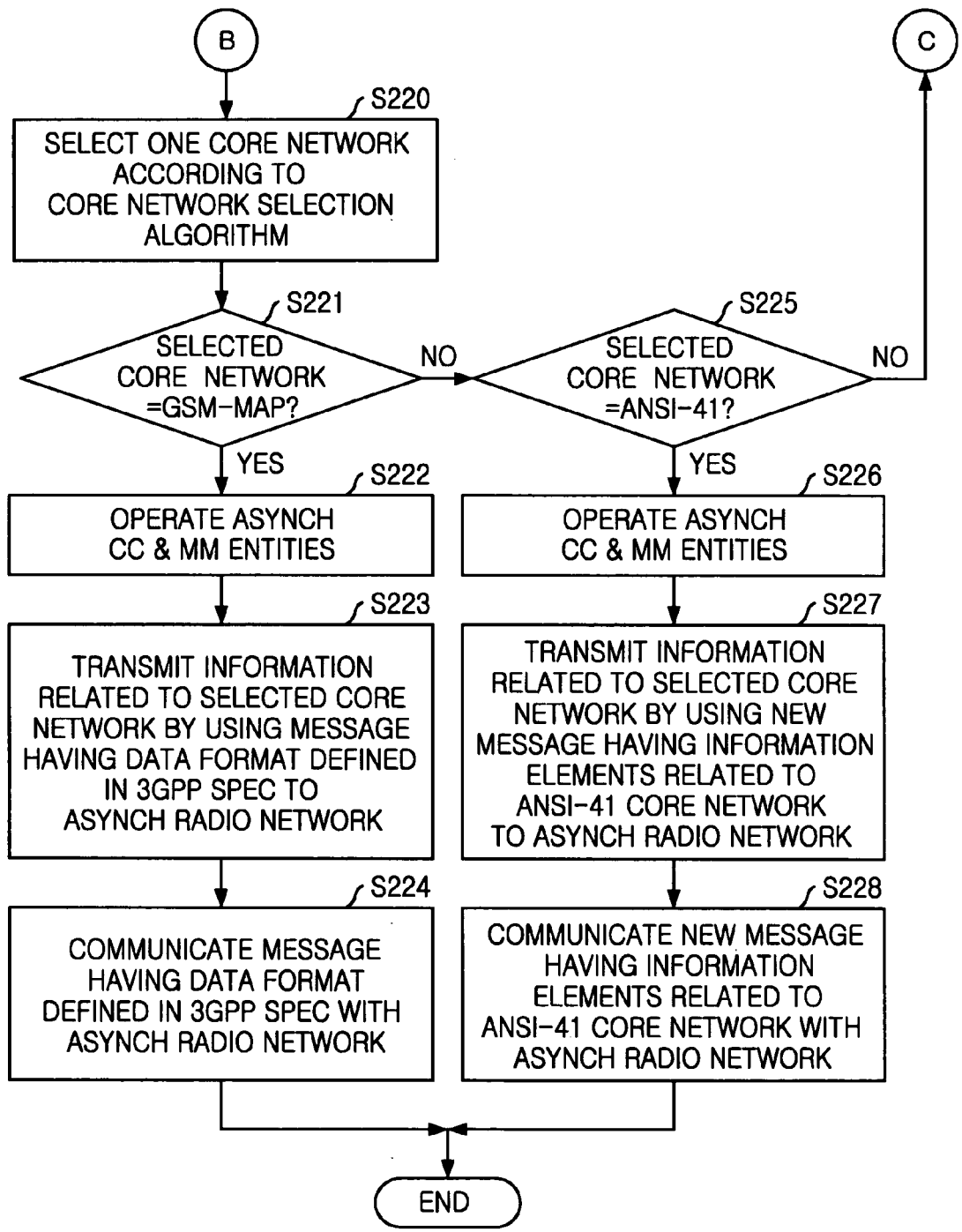

After receiving the system information message having the CN operating type information, the asynchronous mobile station selects one core network to be interfaced with based on the CN operating type information, and informs the asynchronous radio network of a selection result, which processes is illustrated in FIGS. 8A and 8B.

FIGS. 8A and 8B are flow charts illustrating a method for interfacing a message at an asynchronous mobile station in accordance with the present invention.

First, the asynchronous mobile station selects an asynchronous mobile communication system and receives the system information from the asynchronous radio network at steps S211 and S212. The asynchronous mobile station extracts the CN operating type information placed at a predetermined location of the system information message at step S213.

It is determined whether the CN operating type information indicates the asynchronous GSM-MAP core network at step S214. If the CN operating type information indicates the asynchronous GSM-MAP core network, the asynchronous mobile station operates asynchronous call control (CC) and mobility management (MM) entities and communicates a message having a data format defined in the 3GPP specification with the asynchronous radio network at steps S215 and 216.

If the CN operating type information dose not indicate the asynchronous GSM-MAP core network, it is determined whether the CN operating type information indicates the ANSI-41 core network at step S217.

If the CN operating type information indicates the synchronous ANSI-41 core network, the asynchronous mobile station operates synchronous call control (CC) and mobility management (MM) entities and communicates a new message having new information elements related to the ANSI-41 core network with the asynchronous radio network at steps S218 and 219.

If the CN operating type information indicates the asynchronous GSM-MAP and synchronous ANSI-41 core network, the asynchronous mobile station selects one core network based on a core network-selection algorithm which determines according to a charging system, a capability of the mobile station, a capability of the asynchronous mobile communication system selected by the mobile station and environments of the asynchronous radio network.

For example, if the capability of the mobile station is used for selecting the core network, a number of transmission channels provided by the mobile station, a transmission power of the mobile station, kinds of systems supported by the mobile station, an occupied frequency band and kinds of services are considered.

If the selected core network is the GSM-MAP core network, the asynchronous mobile station operates asynchronous CC and MM entities at step S222. Then, the asynchronous mobile station transmits information related to the selected core network to the asynchronous radio network through the message having the data format defined in the 3GPP specification at step S223. There are some ways that the information related to the selected core network is transmitted to the asynchronous radio network. For example, there are a random access method, a method using conventional RRC messages and a method using new RRC messages newly defined.

Then, the asynchronous mobile station communicates messages having a data format defined in the 3GPP specification with the asynchronous radio network, with the asynchronous radio network at step 224.

If the selected core network is the ANSI-41 core network, the asynchronous mobile station operates synchronous CC and MM entities at step S226. Then, the asynchronous mobile station transmits information related to the selected core network through a new message having new information elements related to the ANSI-41 core network, and communicates messages having the new information elements at steps S227 and 228.

If the core network is neither the GSM-MAP core network nor the ANSI-41 core network, the process goes back to the step S212 to receive the system information.

In case that a plurality of core networks can be coupled to the asynchronous mobile communication system, the asynchronous radio network is interfaced with the core network selected by the asynchronous mobile station.

Therefore, a subscriber to the asynchronous mobile communication system can use a service provided in the synchronous ANSI-41 core network.

Figure 9A:
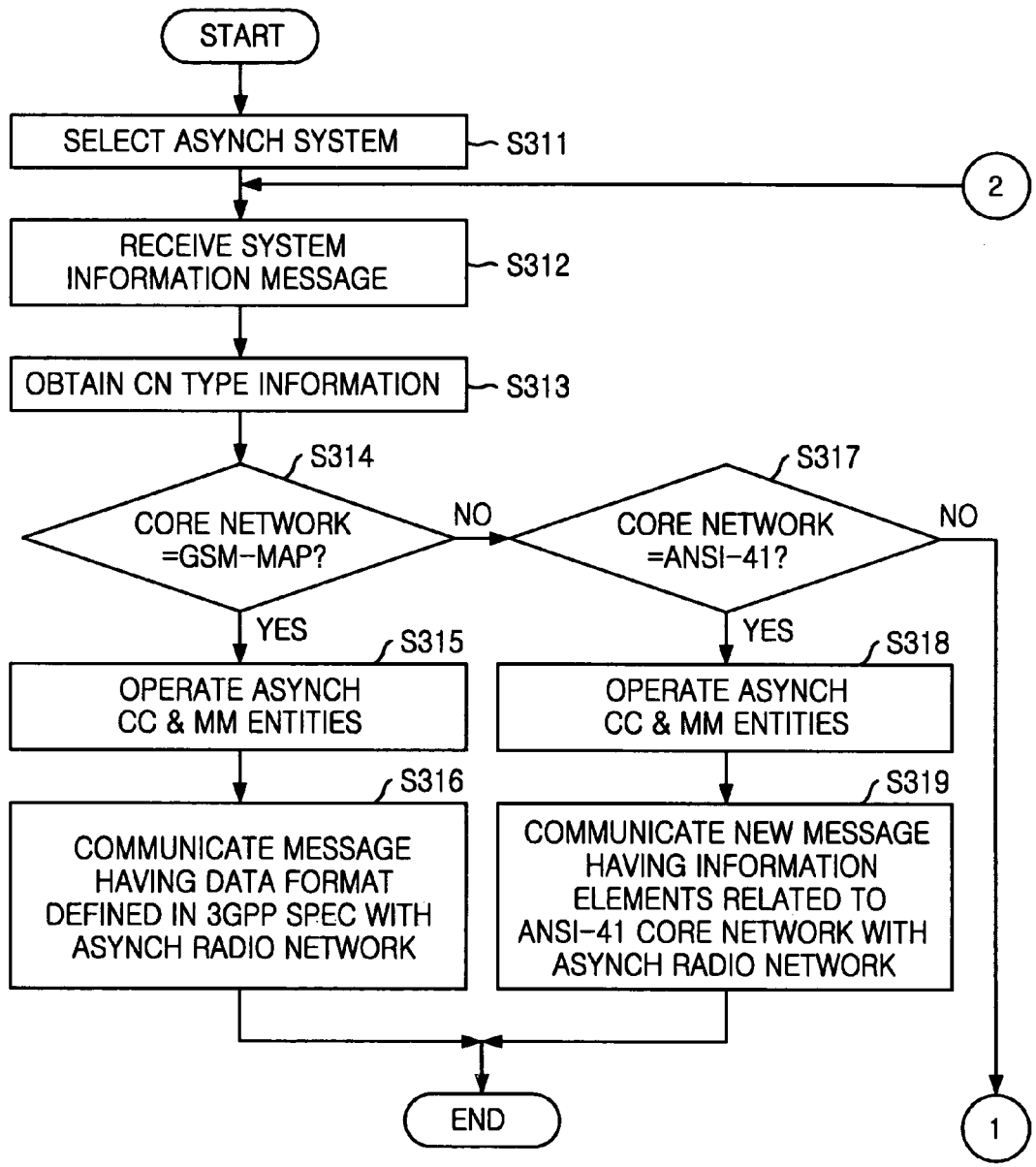
Figure 9B:
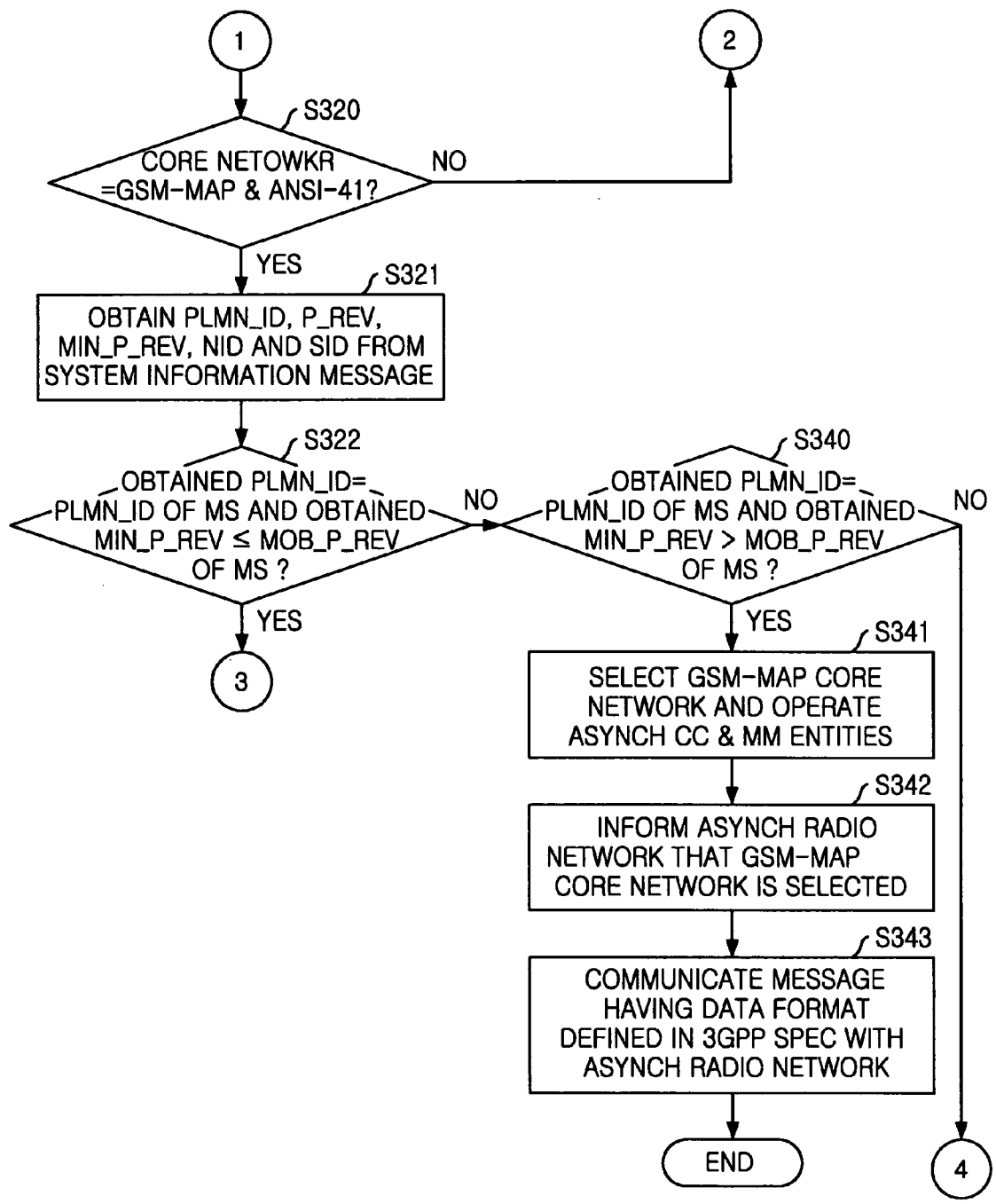

FIGS. 9A to 9C are flow charts illustrating a method for interfacing a message at an synchronous mobile station in accordance with another embodiment of the present invention.

The asynchronous mobile station selects an asynchronous mobile communication system and receives the system information from the asynchronous radio network at steps S311 and S312. The asynchronous mobile station extracts the CN operating type information placed at a predetermined location of the system information message at step S313.

It is determined whether the CN operating type information indicates the asynchronous GSM-MAP core network at step S314. If the CN operating type information indicates the asynchronous GSM-MAP core network, the asynchronous mobile station operates asynchronous call control (CC) and mobility management (MM) entities and communicates a message having a data format defined in the 3GPP specification with the asynchronous radio network at steps S315 and 316.

If the CN operating type information dose not indicate the asynchronous GSM-MAP core network, it is determined whether the CN operating type information indicates the ANSI-41 core network at step S317.

If the CN operating type information indicates the synchronous ANSI-41 core network, the asynchronous mobile station operates synchronous call control (CC) and mobility management (MM) entities and communicates a new message having new information elements related to the ANSI-41 core network with the asynchronous radio network at steps S318 and 319.

If the CN operating type information indicates the asynchronous GSM-MAP and synchronous ANSI-41 core network, the asynchronous mobile station extracts the PLMN_ID, the P_REV, MIN_P_REV, the NID and the SID from the master information block of the system information message at step S321.

At step s322, it is determined whether the extracted PLMN_ID is the same as that of the asynchronous mobile station and the MOB_P_REV of the asynchronous mobile station is larger than the extracted MIN_P_REV. If so, the asynchronous mobile station selects one core network according to a core network selection algorithm at step S323. Then, it is determined that the selected core network is GSM-MAP core network at step S324. The asynchronous mobile station operates asynchronous CC and MM entities at step S325.

The asynchronous mobile station informs the asynchronous radio network that the GSM-MAP core network is selected at step S326. Then, at step S327, the asynchronous mobile station communicates messages with asynchronous radio network, the message having a data format defined in the 3GPP specification.

If the selected core network is not the GSM-MAP core network, the asynchronous mobile station operates asynchronous CC and MM entities at step S328. At step S329, the asynchronous mobile station informs the asynchronous radio network that the ANSI-41 core network is selected.

Then, at step S330, the asynchronous mobile station communicates new messages with asynchronous radio network, the new message having information elements related to the ANSI-41 core network.

At step S340, it is determined whether the extracted PLMN_ID is equal to the PLMN_ID of the mobile station and the extracted MIN_P_REV is lager than the MOB_P_REV of the mobile station. If so, the mobile station selects the GSM-MAP core network and operate asynchronous CC and MM entities at step S341.

The asynchronous mobile station informs the asynchronous radio network that the GSM-MAP core network is selected at step S342. Then, the asynchronous mobile station communicates message having data format defined in 3gpp spec with the asynchronous radio network at step S343.

At step S344, it is determined whether the obtained PLMN_ID is not equal to the PLMN_ID of the asynchronous mobile station and the obtained MIN_P_REV is equal to or smaller than the MOB_P_REV of the asynchronous mobile station. If so, the asynchronous mobile station selects the ANSI-41 core network and operate the synchronous CC and MM entities at step S345.

The asynchronous mobile station informs the asynchronous radio network that the ANSI-41 core network is selected, and communicates new messages having information elements related to the ANSI-41 core network with the asynchronous radio network at steps S346 and S347.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for transmitting a message between an asynchronous mobile communication system and a core network, the asynchronous mobile communication system having a mobile station and a radio network, the method comprising the steps of:
 a) at the radio network, generating and transmitting a system information message having information related to least one core network that is interconnected to the asynchronous mobile communication system, wherein the information includes core network operating type information indicative of an operating type of the at least one core network, a public land mobile network (PLMN) identity and a minimum protocol revision;
 b) at the mobile station, identifying a number of operating types of the at least one core network based on the system information message;
 c) at the mobile station, if it is determined from the number of operating types that there is only one core network interconnected to the asynchronous mobile communication system, operating a call control entity and a mobility management entity according to the identified operating type of the core network;
 d) at the mobile station, if it is determined that from the number of operating types that there are two or more core networks interconnected to the asynchronous mobile communication system, selecting one of the two or more core networks based on the system information message and a PLMN identity and a mobile protocol revision stored in the mobile station,
 operating a call control entity and a mobility management entity according to the identified operating type of the selected core network, and
 d) informing the radio network of information related to the selected core network, wherein the step of selecting includes comparing the PLMN identity and the minimum protocol revision in the system information message with the PLMN identity and the mobile protocol revision stored in the mobile station respectively; and
 e) communicating messages between the mobile station and the radio network, the messages having a data format adapted to the identified operating type of the core network.

2. The method as recited in claim 1, wherein the step a) includes:
 a1) receiving core network operating type information; and
 a2) determining whether the at least one core network interconnected to the asynchronous mobile communication system is a synchronous core network, an asynchronous core network or both of the synchronous and the asynchronous core networks, based on the operating type of the at least one core network.

3. The method as recited in claim 2, wherein the step a) further includes:
 a3) if the at least one core network is the asynchronous core network, setting the core network operating type information in the system information message as "0";

a4) if the at least one core network is the synchronous core network, setting the core network operating type information as "1"; and a5) if the at least one core network is both of the asynchronous core network and the synchronous core network, setting the core network operating type information as "0 & 1".

4. The method as recited in claim 3, wherein the core network operating type information and the information related to the at least one core network are inserted into a master information block of the system information message.

5. The method as recited in claim 1, wherein the step b) includes the steps of:
b1) receiving the system information message; and
b2) extracting the core network operating type information from the system information message.

6. The method as recited in claim 5, wherein the step d) includes the steps of:
d1) the core network operating type information represents that two core networks are coupled thereto, extracting the information related to the at least one core network from the system information message;
d2) comparing the information related to the at least one core network with information stored in the mobile station and corresponding to the information related to the at least one core network; and
d3) selecting one core network to be coupled thereto based on a comparison result.

7. The method as recited in claim 6, wherein the system information message is transmitted to the mobile station through a broadcast channel (BCCH).

8. The method as recited in claim 6, wherein, if the at least one core network interconnected to the asynchronous mobile communication system is of the synchronous operating type, the information related to the at least one core network further includes a protocol revision (P_REV), a network identity (NID) and a system identity (SID).

9. The method as recited in claim 8, wherein the step d2) includes the steps of:
d21) if the extracted PLMN identity is equal to a PLMN identity of the mobile station and the extracted minimum protocol revision (MIN_P_REV) is larger than a mobile protocol revision (MOB_P_REV) of the mobile station, selecting the asynchronous core network;
d22) if the extracted PLMN identity is not equal to the PLMN identity of the mobile station and the extracted MIN_P_REV is equal to or smaller than the MOB_P_REV of the mobile station, selecting the synchronous core network; and
d23) if the extracted PLMN identity is equal to the PLMN identity of the mobile station and the extracted MIN_P_REV is equal to or smaller than the MOB_P_REV of the mobile station, selecting the synchronous core network by using a core network selection method.

10. The method as recited in claim 9, wherein in the core network selection method, one core network is selected based on a number of transmission channels, a kind of systems and a kind of service provided by the mobile station, a transmission power of the mobile station and a frequency band occupied by the mobile station.

11. The method as recited in claim 9, wherein, if the at least one core network is neither the asynchronous core network nor the synchronous core network, going back to step b1).

12. The method as recited in claim 1, wherein, if the selected core network is of the synchronous operating type, the message includes new information elements related to the synchronous core network.

13. A method for transmitting a message between an asynchronous mobile communication system and a core network, the mobile communication system having a mobile station and a radio network, the method comprising the steps of:
a) at the mobile station, identifying operating types of at least one core network based on a system information message received from the radio network, wherein the system information message having information related to the at least one core network that is interconnected to the asynchronous mobile communication system, the information including core network operating type information indicative of an operating type of the at least one core network, a public land mobile network (PLMN) identity, and a minimum protocol revision;
b) at the mobile station, if it is determined from the number of the identified operating types that there is only one core network interconnected to the asynchronous mobile communication system, operating a call control entity and a mobility management entity according to the identified operating type of the core network;
c) at the mobile station, if it is determined from the number of the identified operating types that there are two or more core networks interconnected to the asynchronous mobile communication system, selecting one of the two or more core networks based on the system information message and a PLMN identity and a mobile protocol revision stored in the mobile station, operating a call control entity and a mobility management entity according to the identified operating type of the selected core network, and informing the radio network of information related to the selected core network, wherein the step of selecting includes comparing the PLMN identify and the minimum protocol revision in the system information message with the PLMN identify and the mobile protocol revision stored in the mobile station, respectively; and
d) communicating messages between the mobile station and the radio network, the messages having a data format adapted to the identified operating type of the core network.

14. The method as recited in claim 13, wherein the step a) includes the steps of:
a1) receiving the system information message; and
a2) extracting the core network operating type information from the system information message.

15. The method as recited in claim 14, wherein the step c) includes the steps of:
c1) if the core network operating type information represents that two core networks are coupled thereto, extracting the information related to the at least one core network from the system information message;
c2) comparing the information related to the at least one core network with information stored in the mobile station and corresponding to the information related to the at least one core network; and
c3) selecting one of the two or more core networks to be coupled thereto based on a comparison result.

16. The method as recited in claim 15, wherein, if the at least one core network that is interconnected to the asynchronous mobile communication system is of the synchronous operating type, the information related to the at least one core network further includes a protocol revision (P_REV), a network identity (NID) and a system identity (SID).

17. The method as recited in claim 15, wherein a first of the at least one core network is an asynchronous core network and a second of the at least one core network is a synchronous core network, and the step c2) includes the steps of:
- c21) if the extracted PLMN identity is equal to a PLMN identity of the mobile station and the extracted minimum protocol revision (MIN_P_REV) is larger than a mobile protocol revision (MOB_P_REV) of the mobile station, selecting the asynchronous core network;
- c22) if the extracted PLMN identity is not equal to the PLMN identity of the mobile station and the extracted MIN_P_REV is equal to or smaller than the MOB_P_REV of the mobile station, selecting the synchronous core network; and
- c23) if the extracted PLMN identity is equal to the PLMN identity of the mobile station and the extracted MIN_P_REV is equal to or smaller than the MOB_P_REV of the mobile station, selecting the synchronous core network by using a core network selection method.

18. The method as recited in claim 17, wherein in the core network selection method, one core network is selected based on a number of transmission channels, a kind of systems and a kind of service provided by the mobile station, a transmission power of the mobile station and a frequency band occupied by the mobile station.

19. The method as recited in claim 17, wherein, if the at least one core network is neither the asynchronous core network nor the synchronous core network, going back to step c1).

20. The method as recited in claim 14, wherein the core network operating type information and the information related to the at least one core network are inserted into a master information block of the system information message.

21. The method as recited in claim 20, wherein the system information message is transmitted to the mobile station through a broadcast channel (BCCH).

22. The method as recited in claim 13, wherein, if the selected core network is of the synchronous operating type, the message includes new information elements related to the synchronous core network.

* * * * *